US012501435B2

(12) United States Patent
Yang et al.

(10) Patent No.: US 12,501,435 B2
(45) Date of Patent: Dec. 16, 2025

(54) DATA FORWARDING FOR USER EQUIPMENT WITH DATA TRANSMISSION

(71) Applicant: ZTE Corporation, Guangdong (CN)

(72) Inventors: Li Yang, Shenzhen (CN); Wei Zou, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 466 days.

(21) Appl. No.: 18/153,231

(22) Filed: Jan. 11, 2023

(65) Prior Publication Data

US 2023/0217444 A1     Jul. 6, 2023

Related U.S. Application Data

(63) Continuation of application No. PCT/CN2020/103802, filed on Jul. 23, 2020.

(51) Int. Cl.
*H04W 72/20*      (2023.01)
*H04W 76/27*      (2018.01)
*H04W 92/10*      (2009.01)

(52) U.S. Cl.
CPC .......... *H04W 72/20* (2023.01); *H04W 76/27* (2018.02); *H04W 92/10* (2013.01)

(58) Field of Classification Search
CPC ..... H04W 72/20; H04W 76/27; H04W 92/10; H04W 88/08; H04W 76/22; H04W 76/30; H04W 76/11; H04W 76/12; H04W 76/20; H04W 76/18; H04W 72/121; H04W 80/06; H04W 80/08; H04W 80/04; H04W 4/40; H04W 28/04; H04W 28/06; H04L 1/00; H04L 12/46

(Continued)

(56) References Cited

U.S. PATENT DOCUMENTS 8,451,795 B2 *    5/2013    Ho ........................ H04L 1/1896
                                                                    455/436
10,897,708 B2 *    1/2021    Shih .................. H04W 36/0005
(Continued)

FOREIGN PATENT DOCUMENTS

CN           101779493 A      7/2010
CN           108616988 A      10/2018
(Continued)

OTHER PUBLICATIONS

Extended European Search Report on EP 20946077.3 dated Jun. 20, 2023 (11 pages).

(Continued)

*Primary Examiner* — Man U Phan
(74) *Attorney, Agent, or Firm* — Foley & Lardner LLP

(57) ABSTRACT

Presented are systems, methods, apparatuses, or computer-readable media for data forwarding for user equipment with data transmission. A non-anchor node may receive user data of a wireless communication device to send uplink. The non-anchor node may decode the user data into an uplink air interface protocol protocol data unit (PDU), using a partial portion of context information of the wireless communication device. The non-anchor node may send the uplink air interface protocol PDU in a user data container of a first message, to an anchor node having full context information of the wireless communication device.

20 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,904,941 | B2* | 1/2021 | Kim | H04W 76/11 |
| 11,129,041 | B2* | 9/2021 | Chen | H04W 76/27 |
| 11,206,595 | B2* | 12/2021 | Edge | H04W 4/029 |
| 11,564,277 | B2* | 1/2023 | Kim | H04W 76/19 |
| 11,683,738 | B2* | 6/2023 | Edge | H04W 4/029 |
| | | | | 370/331 |
| 11,985,725 | B2* | 5/2024 | Han | H04W 76/27 |
| 12,022,550 | B2* | 6/2024 | Kim | H04W 76/22 |
| 12,041,578 | B2* | 7/2024 | Edge | H04L 43/0864 |
| 12,052,588 | B2* | 7/2024 | Liang | H04W 76/19 |
| 12,167,489 | B2* | 12/2024 | Wang | H04W 8/00 |
| 2018/0004205 | A1 | 1/2018 | Matsunaga et al. | |
| 2018/0042057 | A1 | 2/2018 | Johansson et al. | |
| 2018/0234839 | A1 | 8/2018 | Tenny et al. | |
| 2018/0368196 | A1 | 12/2018 | Gage | |
| 2019/0059027 | A1 | 2/2019 | Yang et al. | |
| 2020/0022083 | A1 | 1/2020 | Jin et al. | |
| 2023/0189380 | A1* | 6/2023 | Palat | H04W 76/11 |
| | | | | 370/329 |

FOREIGN PATENT DOCUMENTS

| | | |
|---|---|---|
| CN | 109644382 A | 4/2019 |
| CN | 110169154 A | 8/2019 |
| CN | 110636565 A | 12/2019 |
| CN | 110786065 A | 2/2020 |
| CN | 111034265 A | 4/2020 |
| CN | 115804201 A | 3/2023 |
| EP | 3 813 428 A1 | 4/2021 |
| WO | WO-2018/104579 A1 | 6/2018 |
| WO | WO-2019/242341 A1 | 12/2019 |
| WO | WO-2020/092527 A1 | 5/2020 |
| WO | WO-2022/011659 A1 | 1/2022 |

OTHER PUBLICATIONS

Ericsson, "Update to Solution 4.18 for Infrequent Small Data," SA WG2 Meeting #117; SA WG2 Temporary Document; S2-165561; Kaohsiung City, Taiwan; Oct. 17-21, 2016 (4 pages).
First Office Action and Search Report for CN App. No. 202080102165.3 dated May 20, 2024 (with English translation, 16 pages).
International Search Report and Written Opinion for PCT Appl. No. PCT/CN2020/103802 mailed Apr. 1, 2021 (9 pages).
Qualcomm Incorporated: "Small data transmission in inactive state" 3GPP TSG-RAN WG3 NR Ad Hoc Meeting; R3-170158; Jan. 19, 2017; Spokane, Washington (4 pages).

* cited by examiner

DATA FORWARDING FOR USER EQUIPMENT WITH DATA TRANSMISSION

CROSS-REFERENCE TO RELATED APPLICATION

This application claims the benefit of priority under 35 U.S.C. § 120 as a continuation of PCT Patent Application No. PCT/CN2020/103802, filed on Jul. 23, 2020, the disclosure of which is incorporated herein by reference in its entirety.

TECHNICAL FIELD

The disclosure relates generally to wireless communications, including but not limited to systems and methods for data forwarding for user equipment with data transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A non-anchor node may receive user data of a wireless communication device to send uplink. The non-anchor node may decode the user data into an uplink air interface protocol protocol data unit (PDU), using a partial portion of context information of the wireless communication device. The non-anchor node may send the uplink air interface protocol PDU in a user data container of a first message, to an anchor node having full context information of the wireless communication device.

In some embodiments, the non-anchor node may receive the user data from the wireless communication device after initiating a radio resource control (RRC) connection resume procedure. In some embodiments, the non-anchor node may receive, from the anchor node, the uplink received air interface protocol PDU in a user data container of a second message, with the full context information of the wireless communication device. In some embodiments, the non-anchor node may decode using the full context information of the wireless communication device, the uplink air interface protocol PDU to at least one of: an air interface protocol service data unit (SDU) or a quality of service (QoS) flow packet.

In some embodiments, the anchor node may include a first next generation Node B (gNB) or next-generation evolved node B (ng-eNB). In some embodiments, the non-anchor node may include a second gNB or ng-eNB. In some embodiments, the first message may include an Xn application protocol (XnAP) RETRIEVE UE CONTEXT REQUEST message or a first XnAP RRC TRANSFER message. In some embodiments, the second message may include an XnAP RETRIEVE UE CONTEXT RESPONSE message or a second XnAP RRC TRANSFER message.

In some embodiments, the non-anchor node may receive the user data from the wireless communication device after initiating a radio resource control (RRC) connection resume procedure. In some embodiments, the non-anchor node may receive, from the anchor node, a RRC resume container in a second message, without the context information of the wireless communication device. In some embodiments, the non-anchor node may send, to the wireless communication device, content of the RRC resume container.

In some embodiments, the anchor node may include a first next generation Node B (gNB) or next-generation evolved node B (ng-eNB). In some embodiments, the non-anchor node may include a second gNB or ng-eNB. In some embodiments, the first message comprises an Xn application protocol (XnAP) RETRIEVE UE CONTEXT REQUEST message or a first XnAP RRC TRANSFER message. In some embodiments, the second message may include an XnAP RETRIEVE UE CONTEXT FAILURE message or a second XnAP RRC TRANSFER message.

In some embodiments, the non-anchor node may receive the user data without RRC signaling from the wireless communication device while in a radio resource control (RRC) inactive state. In some embodiments, the non-anchor node may receive, from the anchor node, a user data container in a second message, without the context information of the wireless communication device. In some embodiments, the non-anchor node may send to the wireless communication device, content of the user data container.

In some embodiments, the anchor node may include a first next generation Node B (gNB) or next-generation evolved node B (ng-eNB). In some embodiments, the non-anchor node may include a second gNB or ng-eNB. In some embodiments, the first message may include a first Xn application protocol (XnAP) USER DATA TRANSFER message or a first XnAP RRC TRANSFER message. In some embodiments, the second message may include a second XnAP USER DATA TRANSFER message or a second XnAP RRC TRANSFER message.

In some embodiments, the non-anchor node may receive the user data from the wireless communication device after initiating a radio resource control (RRC) connection resume procedure. In some embodiments, the non-anchor node may receive the user data from the wireless communication device after initiating a radio resource control (RRC) connection resume procedure. In some embodiments, the non-anchor node may send to the wireless communication device, content of the user data container.

In some embodiments, the anchor node comprises a centralized unit (CU) of first next generation Node B (gNB) or next-generation evolved node B (ng-eNB). In some embodiments, the non-anchor node may include a distributed unit (DU) of a second gNB or ng-eNB. In some embodiments, the first message may include a F1 application protocol (F1AP) UPLINK RRC MESSAGE TRANSFER message, F1AP UE CONTEXT MODIFICATION REQUIRED message, F1AP INITIAL UL RRC MESSAGE TRANSFER message. In some embodiments, the second message may include an F1AP DOWNLINK RRC MESSAGE TRANSFER message, F1AP UE CONTEXT MODIFICATION CONFIRM message.

In some embodiments, the non-anchor node may receive the user data without RRC signaling from the wireless communication device while in a radio resource control (RRC) inactive state. In some embodiments, the non-anchor node may receive, from the anchor node, a user data container in a second message, without the context information of the wireless communication device. In some embodiments, the non-anchor node may send, node to the wireless communication device, content of the user data container.

In some embodiments, the anchor node may include a centralized unit (CU) of first next generation Node B (gNB) or next-generation evolved node B (ng-eNB). In some embodiments, the non-anchor node may include a distributed unit (DU) of a second gNB or ng-eNB. In some embodiments, the first message may include a first F1 application protocol (F1AP) USER DATA TRANSFER message, F1AP UE CONTEXT MODIFICATION REQUIRED message, F1AP INITIAL UL RRC MESSAGE TRANSFER message. In some embodiments, the second message comprises a second F1AP USER DATA TRANSFER message, F1AP UE CONTEXT MODIFICATION REQUEST message, F1AP UE CONTEXT MODIFICATION CONFIRM message.

In some embodiments, the non-anchor node may receive the user data without RRC signaling from the wireless communication device while in a radio resource control (RRC) inactive state. In some embodiments, the non-anchor node may receive, from the anchor node, a user data container in a second message, without the context information of the wireless communication device. In some embodiments, the non-anchor node may send, to the wireless communication device, content of the user data container.

In some embodiments, the anchor node may include a centralized unit user plane (CU-UP) of first next generation Node B (gNB) or next-generation evolved node B (ng-eNB). In some embodiments, the non-anchor node may include a centralized unit control plane (CU-CP) of a second gNB or ng-eNB. In some embodiments, the first message may include a first E1 application protocol (E1AP) USER DATA TRANSFER message, a E1AP BEARER CONTEXT MODIFICATION REQUEST message. In some embodiments, the second message may include a second E1AP USER DATA TRANSFER message, a E1AP BEARER CONTEXT MODIFICATION REQUIRED message.

In some embodiments, the non-anchor node may receive the user data from the wireless communication device after initiating a radio resource control (RRC) connection resume procedure. In some embodiments, the non-anchor node may receive, from the anchor node, a user data container in a second message, without the context information of the wireless communication device. In some embodiments, the non-anchor node may send to the wireless communication device, content of the user data container.

In some embodiments, the anchor node may include a centralized unit user plane (CU-UP) of first next generation Node B (gNB) or next-generation evolved node B (ng-eNB). In some embodiments, the non-anchor node may include a centralized unit control plane (CU-CP) of a second gNB or ng-eNB. In some embodiments, the first message may include a E1 application protocol (E1AP) BEARER CONTEXT MODIFICATION REQUEST message, a first E1AP USER DATA TRANSFER message or a E1AP BEARER CONTEXT MODIFICATION CONFIRM message. In some embodiments, the second message may include an E1AP BEARER CONTEXT MODIFICATION RESPONSE message, a second E1AP USER DATA TRANSFER message or a E1AP BEARER CONTEXT MODIFICATION REQUIRED message.

In some embodiments, the user data container comprises at least one of: an information element (IE); an identification of the wireless communication device; an identification of context information of the wireless communication device; an identification of a data radio bearer (DRB) associated with the uplink air interface protocol PDU; an identification of a PDU session associated with the uplink air interface protocol PDU; an identification of an associated quality of service (QoS) flow; a sequence number (SN) associated with the uplink air interface protocol PDU; a hyper frame number (HFN) associated with the uplink air interface protocol PDU; or a count value associated with the uplink air interface protocol PDU.

At least one aspect is directed to a system, a method, an apparatus, or a computer-readable medium. An anchor node may have full context information of a wireless communication device. The anchor node may receive an uplink air interface protocol protocol data unit (PDU) in a user data container of a first message, from a non-anchor node. The uplink air interface PDU may have user data of the wireless communication device to send uplink decoded by the non-anchor node using a partial portion of context information of the wireless communication device.

In some embodiments, the anchor node may send to the non-anchor node, the uplink received air interface protocol PDU in a user data container of a second message, with the full context information of the wireless communication device. The non-anchor node may receive the user data from the wireless communication device after initiating a radio resource control (RRC) connection resume procedure. In some embodiments, the anchor node may cause the non-anchor node to decode, using the full context information of the wireless communication device, the uplink air interface protocol PDU to at least one of: an air interface protocol service data unit (SDU) or a quality of service (QoS) flow packet.

In some embodiments, the anchor node may include a first next generation Node B (gNB) or next-generation evolved node B (ng-eNB). In some embodiments, the non-anchor node may include a second gNB or ng-eNB. In some embodiments, the first message may include an Xn application protocol (XnAP) RETRIEVE UE CONTEXT REQUEST message or a first XnAP RRC TRANSFER message. In some embodiments, the second message may include an XnAP RETRIEVE UE CONTEXT RESPONSE message or a second XnAP RRC TRANSFER message.

In some embodiments, the anchor node may send to the non-anchor node, a radio resource control (RRC) resume container in a second message, without the context information of the wireless communication device. The non-anchor node may receive the user data from the wireless communication device after initiating a RRC connection resume procedure. In some embodiments, the anchor node may cause the non-anchor node to send to the wireless communication device, content of the RRC resume container.

In some embodiments, the anchor node may include a first next generation Node B (gNB) or next-generation evolved node B (ng-eNB). In some embodiments, the non-anchor node may include a second gNB or ng-eNB. In some embodiments, the first message comprises an Xn application protocol (XnAP) RETRIEVE UE CONTEXT REQUEST message or a first XnAP RRC TRANSFER message. In some embodiments, the second message may include an XnAP RETRIEVE UE CONTEXT FAILURE message or a second XnAP RRC TRANSFER message.

In some embodiments, the anchor node may send to the non-anchor node, a user data container in a second message, without the context information of the wireless communication device. The non-anchor node may receive the user data without RRC signaling from the wireless communication device while in a radio resource control (RRC) inactive state. In some embodiments, the anchor node may cause the non-anchor node to send, to the wireless communication device, content of the user data container.

In some embodiments, the anchor node may include a first next generation Node B (gNB) or next-generation evolved node B (ng-eNB). In some embodiments, the non-anchor node may include a second gNB or ng-eNB. In some embodiments, the first message may include a first Xn application protocol (XnAP) USER DATA TRANSFER message or a first XnAP RRC TRANSFER message. In some embodiments, the second message may include a second XnAP USER DATA TRANSFER message or a second XnAP RRC TRANSFER message.

In some embodiments, the anchor node may send, to the non-anchor node, a user data container in a second message, without the context information of the wireless communication device. The non-anchor node may receive the user data from the wireless communication device after initiating a radio resource control (RRC) connection resume procedure. In some embodiments, the anchor node may cause the non-anchor node to send to the wireless communication device, content of the user data container.

In some embodiments, the anchor node comprises a centralized unit (CU) of first next generation Node B (gNB) or next-generation evolved node B (ng-eNB). In some embodiments, the non-anchor node may include a distributed unit (DU) of a second gNB or ng-eNB. In some embodiments, the first message may include a F1 application protocol (F1AP) UPLINK RRC MESSAGE TRANSFER message, F1AP UE CONTEXT MODIFICATION REQUIRED message, F1AP INITIAL UL RRC MESSAGE TRANSFER message. In some embodiments, the second message may include an F1AP DOWNLINK RRC MESSAGE TRANSFER message, F1AP UE CONTEXT MODIFICATION CONFIRM message.

In some embodiments, the anchor node may send, to the non-anchor node, a user data container in a second message, without the context information of the wireless communication device. The non-anchor node may receive the user data without RRC signaling from the wireless communication device while in a radio resource control (RRC) inactive state. In some embodiments, the anchor node may cause the non-anchor node send to the wireless communication device, content of the user data container.

In some embodiments, the anchor node may include a centralized unit (CU) of first next generation Node B (gNB) or next-generation evolved node B (ng-eNB). In some embodiments, the non-anchor node may include a distributed unit (DU) of a second gNB or ng-eNB. In some embodiments, the first message may include a first F1 application protocol (F1AP) USER DATA TRANSFER message, F1AP UE CONTEXT MODIFICATION REQUIRED message, F1AP INITIAL UL RRC MESSAGE TRANSFER message. In some embodiments, the second message comprises a second F1AP USER DATA TRANSFER message, F1AP UE CONTEXT MODIFICATION REQUEST message, F1AP UE CONTEXT MODIFICATION CONFIRM message.

In some embodiments, the anchor node may send, to the non-anchor node, a user data container in a second message, without the context information of the wireless communication device. The non-anchor node may receive the user data without RRC signaling from the wireless communication device while in a radio resource control (RRC) inactive state. In some embodiments, the anchor node may cause the non-anchor node to send to the wireless communication device, content of the user data container.

In some embodiments, the anchor node may include a centralized unit user plane (CU-UP) of first next generation Node B (gNB) or next-generation evolved node B (ng-eNB). In some embodiments, the non-anchor node may include a centralized unit control plane (CU-CP) of a second gNB or ng-eNB. In some embodiments, the first message may include a first E1 application protocol (E1AP) USER DATA TRANSFER message, a E1AP BEARER CONTEXT MODIFICATION REQUEST message. In some embodiments, the second message may include a second E1AP USER DATA TRANSFER message, a E1AP BEARER CONTEXT MODIFICATION REQUIRED message.

In some embodiments, the anchor node may send, to the non-anchor node, a user data container in a second message, without the context information of the wireless communication device. The non-anchor node may receive the user data from the wireless communication device after initiating a radio resource control (RRC) connection resume procedure. In some embodiments, the anchor node may cause the non-anchor node to send to the wireless communication device, content of the user data container.

In some embodiments, the anchor node may include a centralized unit user plane (CU-UP) of first next generation Node B (gNB) or next-generation evolved node B (ng-eNB). In some embodiments, the non-anchor node may include a centralized unit control plane (CU-CP) of a second gNB or ng-eNB. In some embodiments, the first message may include a E1 application protocol (E1AP) BEARER CONTEXT MODIFICATION REQUEST message, a first E1AP USER DATA TRANSFER message or a E1AP BEARER CONTEXT MODIFICATION CONFIRM message. In some embodiments, the second message may include an E1AP BEARER CONTEXT MODIFICATION RESPONSE message, a second E1AP USER DATA TRANSFER message or a E1AP BEARER CONTEXT MODIFICATION REQUIRED message.

In some embodiments, the user data container comprises at least one of: an information element (IE); an identification of the wireless communication device; an identification of context information of the wireless communication device; an identification of a data radio bearer (DRB) associated with the uplink air interface protocol PDU; an identification of a PDU session associated with the uplink air interface protocol PDU; an identification of an associated quality of service (QoS) flow; a sequence number (SN) associated with the uplink air interface protocol PDU; a hyper frame number (HFN) associated with the uplink air interface protocol PDU; or a count value associated with the uplink air interface protocol PDU.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
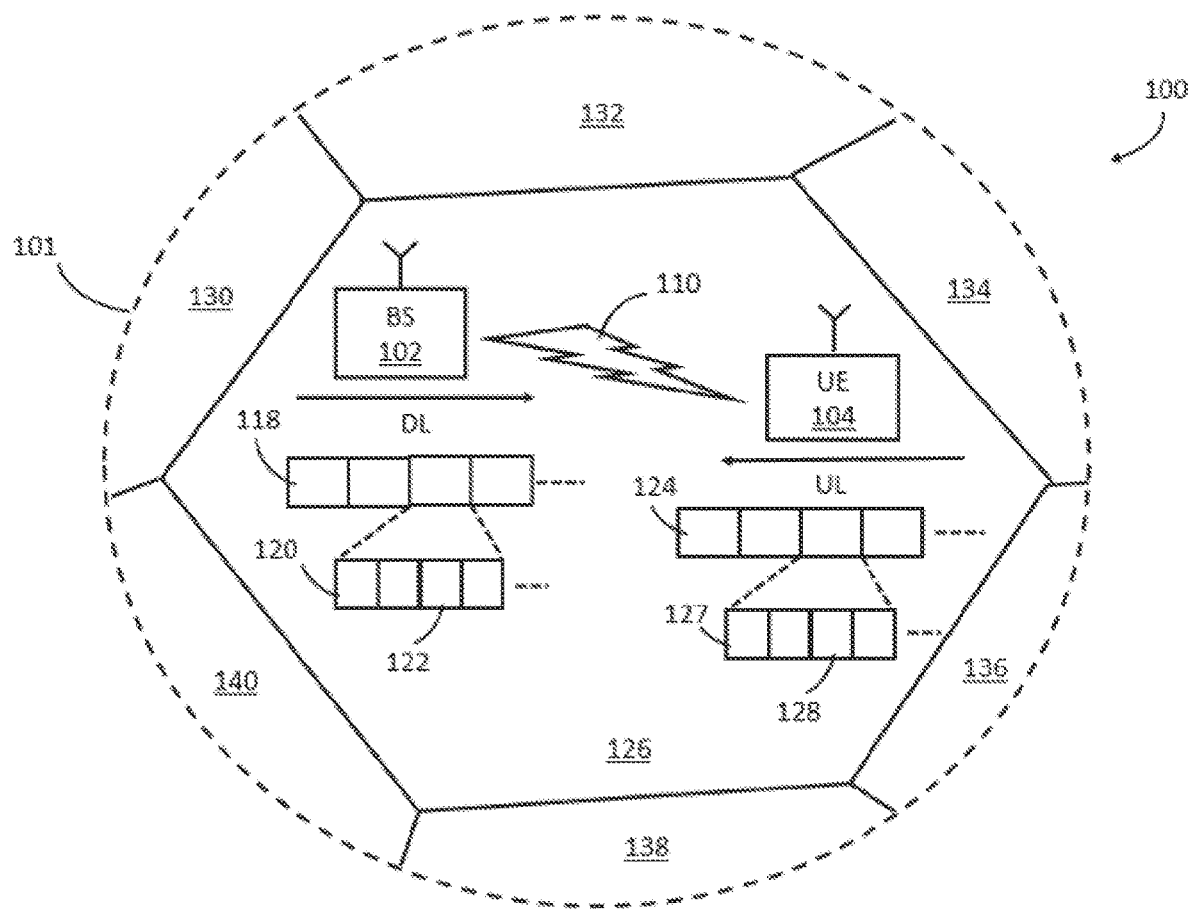
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| AM | Acknowledged Mode |
| AMF | Access Mobility Function |
| CG | Configured Grant |
| CP | Control Plane |
| CU | Centralized Unit |
| DCI | Downlink Control Information |
| DL | Down Link or Downlink |
| DRB | Dedicated Radio Bearer |
| F1AP | F1 Application Protocol |
| F1-U | F1 User Plane |
| GPRS | General Packet Radio Service |
| GTP | GPRS Tunneling Protocol |
| GTP-U | GTP User |
| MCG | Master Cell Group |
| MN | Master Node |
| NG | Next Generation |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QoS | Quality of Service |
| RA | Random Access |
| RAN | Random Access Network |
| RNA | RAN Notification Area |
| RB | Resource Bearer |
| RE | Resource Element |
| RLC | Radio Link Control |
| RRM | Radio Resource Management |
| RS | Reference Signal |
| RU | Radio Unit |
| RRC | Radio Resource Control |
| SCG | Secondary Cell Gropu |
| SDU | Service Data Unit |
| SMF | Session Management Function |
| SN | Secondary Node |
| SRB | Signaling Radio Bearer |
| TC | Transmission Configuration |
| TCI | Transmission Configuration Indicator |
| TM | Transparent Mode |
| TNL | Transport Network Layer |
| UE | User Equipment |
| UL | Up Link or Uplink |
| UM | Unacknowledged Mode |
| UP | User Plane |
| UPF | User Plane Function |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
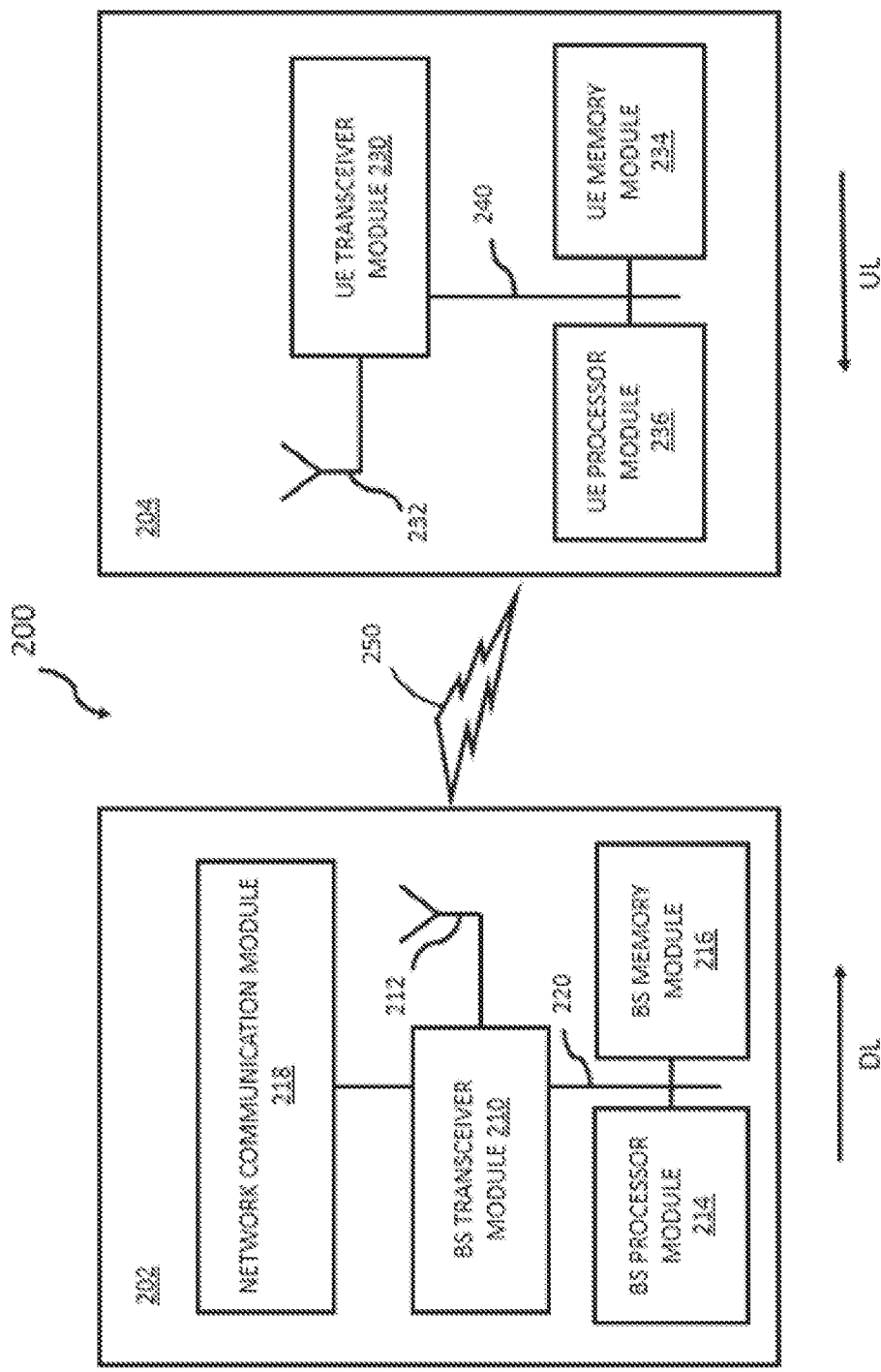
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Data Forwarding for User Equipment with Data Transmission For user equipment (UE) in a radio resource control (RRC) inactive (RRC_INACTIVE) state, a network (NW) may perform uplink (UP) or downlink (DL) data transmission without reconfiguring the UE to RRC_CONNECTED state. For a UL transmission, the radio access network (RAN) downstream receiving node may forward the UL received user packets to the upstream node. Conversely, for a DL transmission, the RAN upstream receiving node may forward the received DL user packets to the downstream node. For small, sporadic and infrequent user packets, the general packet radio service tunneling protocol (GTP)-U tunnel per dedicated radio bearer (DRB) reserved for data forwarding may be a waste of transport network layer (TNL) resources. There may be thus technical challenges with realizing more economic data forwarding for UE, especially with only small or sporadic data transmissions.

The RRC inactive state (e.g., as introduced in 3GPP NR Rel-15) may provide a power efficient state with low control-plane transmission latency and lower UE battery consumption. For a UE in the RRC inactive state, the last serving gNB may maintain the UE context and the associated next generation (NG) connections to the 5GC (5G core network), such that all deactivated radio bearers (e.g., signaling radio bearer (SRB) and dedicated radio bearer (DRB)) may be recovered immediately after a successful random access and RRC resume process on RAN side. The gNB with the UE context and the associated NG connections may referred to as anchor gNB. A UE may have single anchor gNB in RRC_INACTIVE state and other gNBs may be referred as non-anchor gNBs.

Figure 3:
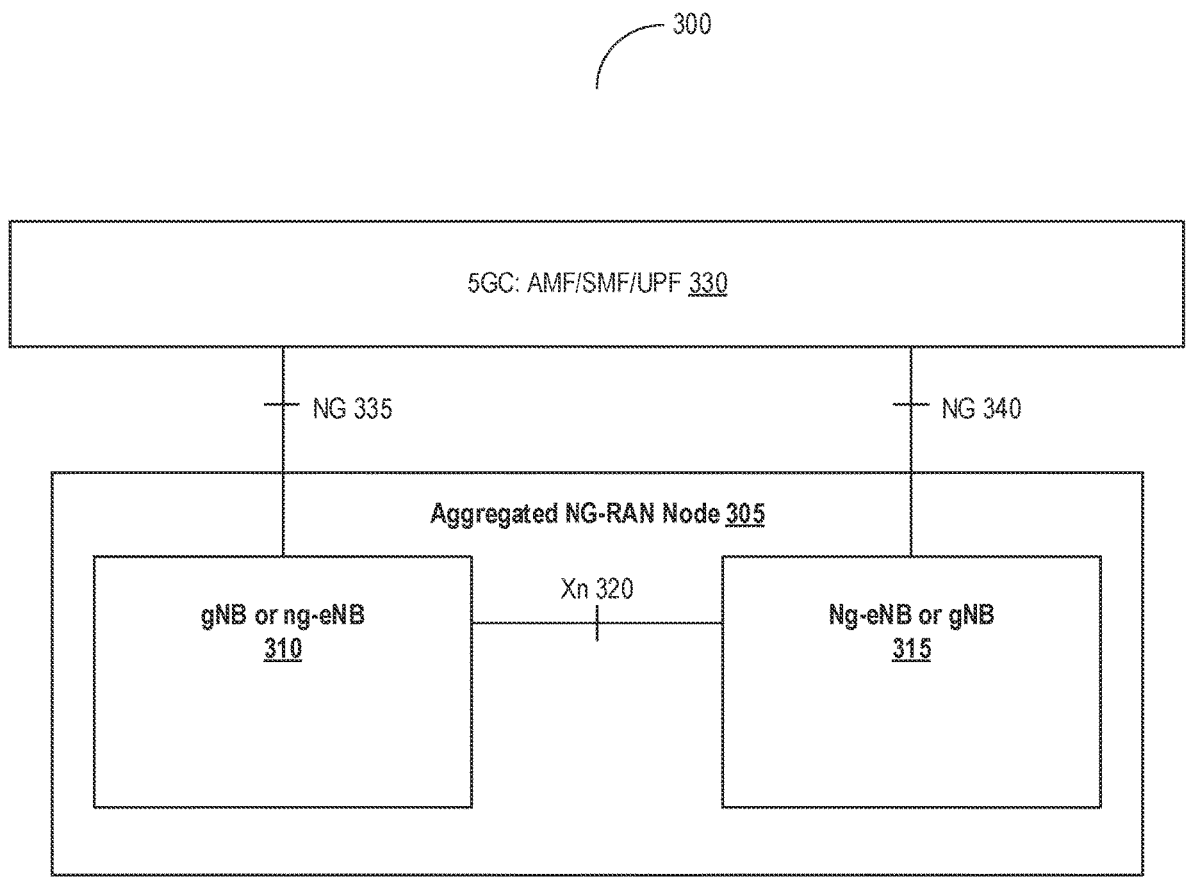
FIG. 3 illustrates a block diagram of a system for an aggregated next generation (NG) random access network (RAN) node in accordance with an illustrative embodiment.

Referring now to FIG. 3, depicted is a block diagram of a system 300 for an aggregated next generation (NG) random access network (RAN) node 305. In the aggregated NG-RAN node 305, the aggregated NG-RAN nodes (gNB 310 or ng-eNB 315) may be inter-connected with an Xn connection 320. If the UE in the RRC inactive state resumes a RRC connection and uses RBs in certain non-anchor gNB, then data forwarding may be performed over Xn-U GTP-U tunnel per DRB. For example, the anchor gNB may forward the DL received user packets (e.g., a packet data convergence protocol (PDCP) service data unit (SDU)) from UPF 330 to the non-anchor gNB for further transmission over the air until path switch procedure is finished. In addition, the non-anchor gNB may forward the UL received user packets (e.g., PDCP SDU) from the air interface to the anchor gNB for further transmission over NG-U 335 or 340 until a path switch procedure is finished.

Figure 4:
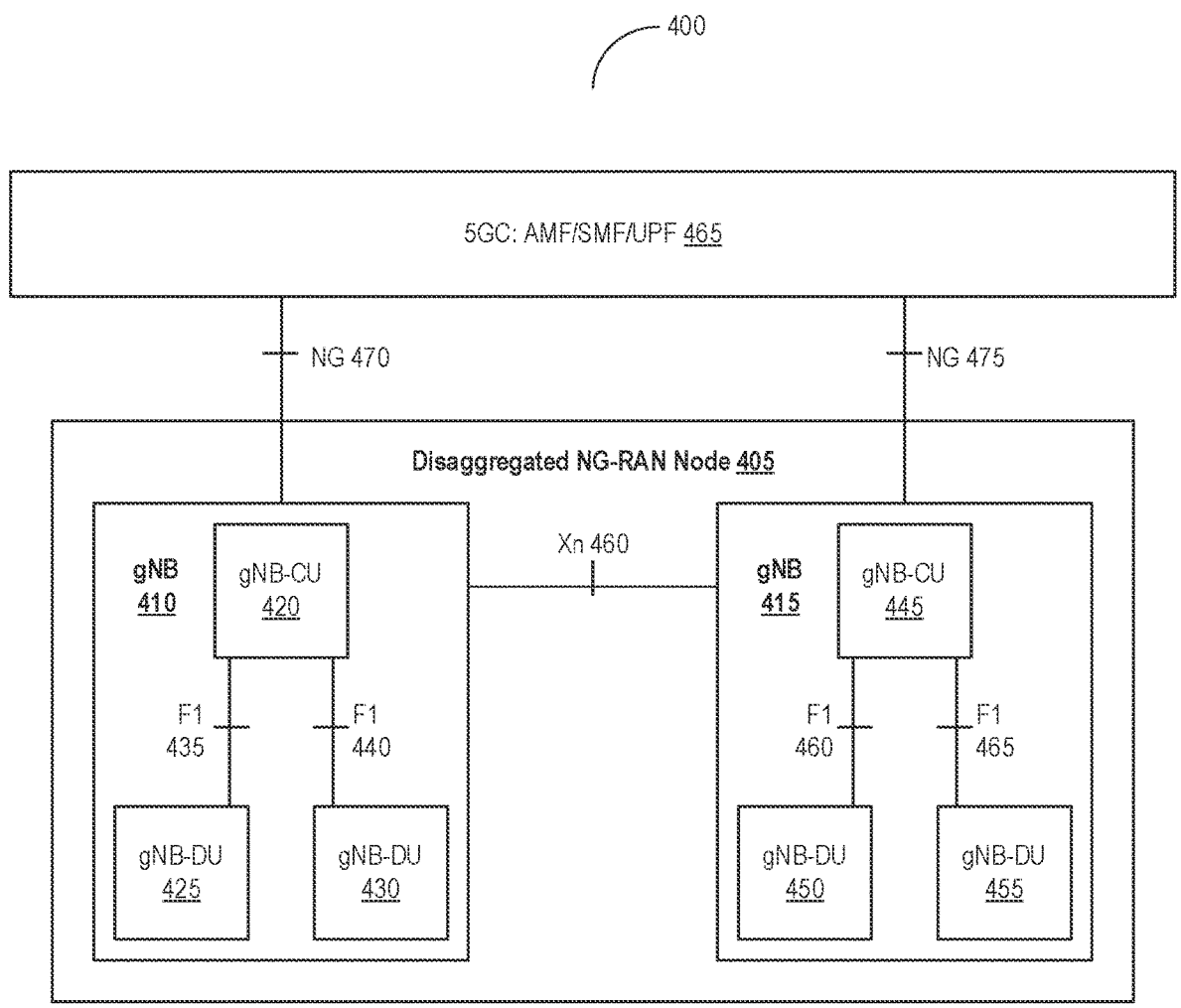
FIG. 4 illustrates a block diagram of a system for an disaggregated next generation (NG) random access network (RAN) node with centralized unit (CU) and distributed unit (DU) split architecture in accordance with an illustrative embodiment.

Referring now to FIG. 4, depicted is a block diagram of a system 400 for an disaggregated next generation (NG) random access network (RAN) node 405 with centralized unit (CU) and distributed unit (DU) split architecture. In the disaggregated NG RAN node 405, the gNB 410 and 415 may be further split into gNB-CU 420 and 445 and gNB-DU 425, 430, 450, and 455 connected via an interconnected with a respective F1 connection 435, 440, 460, and 465. The gNBs 410 and 415 may be connected via an Xn connection 460. The gNB-CU 420 or 445 with the UE context and the associated NG connections to the 5GC for a UE in RRC INACTIVE state may be referred to as anchor gNB-CU. If configured, the gNB-DU 425, 430, 450, or 445 with the UE context and the associated F1 connections 435, 440, 460, or 465 to the anchor gNB-CU for a UE in the RRC inactive state is referred to as anchor gNB-DU. UE may have single anchor gNB-CU, but may have one or multiple anchor gNB-DUs in the RRC inactive state.

If the UE in the RRC inactive state resumes a RRC connection and RBs in certain anchor gNB-DU, then data forwarding may be performed over F1-U GTP-U tunnel per DRB. For instance, the anchor gNB-CU may forward the DL received user packets (e.g., PDCP protocol data unit (PDU)) from UPF 465 to the anchor gNB-DU for further transmission over the air. In addition, the anchor gNB-DU may forward the UL received user packets (e.g., PDCP PDU) from the air interface to the anchor gNB-CU for further transmission over NG-U 470 or 475. If the UE in RRC inactive state resumes a RRC connection and RBs in a certain non-anchor gNB-DU without any UE context, then UE context may be set up firstly with the non-anchor gNB-DU. The anchor gNB-DU may become one of anchor gNB-DUs for the UE and then may follow above data forwarding behaviors.

Figure 5:
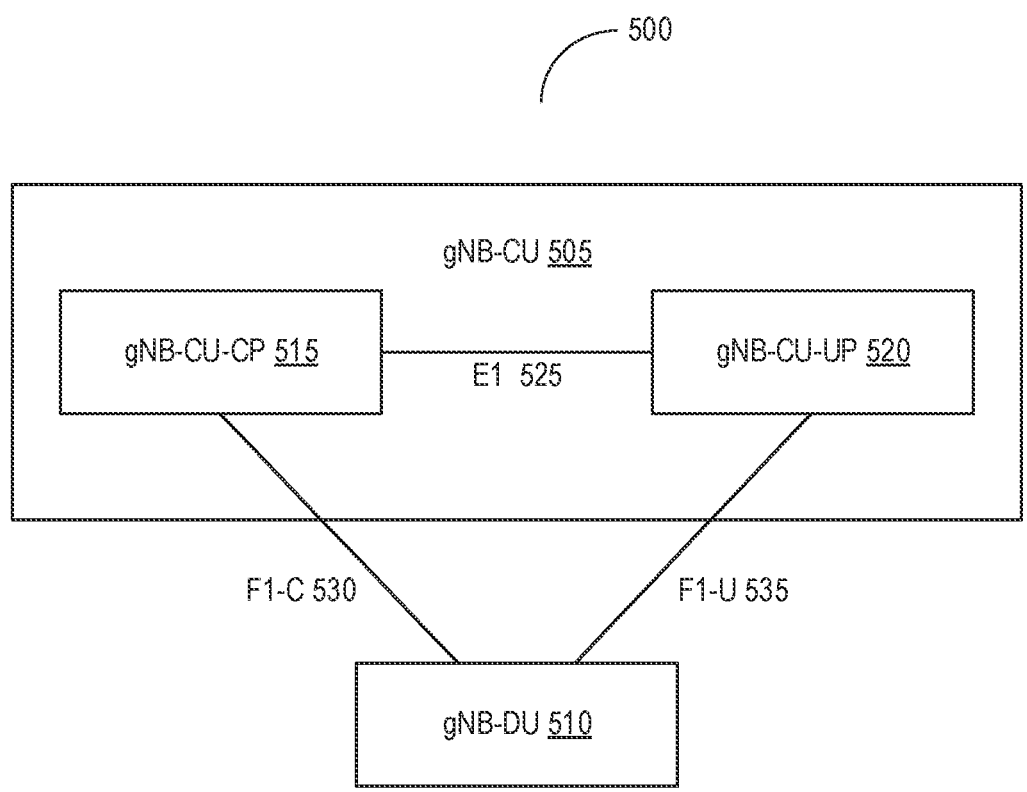
FIG. 5 illustrates a block diagram of a system for an disaggregated next generation (NG) random access network (RAN) node with centralized unit (CU) with control plane (CP) and user plane (UP) and distributed unit (DU) split architecture in accordance with an illustrative embodiment.

Referring now to FIG. 5, depicted is a block diagram of a system 500 for an disaggregated next generation (NG) random access network (RAN) node 505 with centralized unit (CU) with control plane (CP) and user plane (UP) and distributed unit (DU) split architecture. The system 500 may be similar to the system 400, but with the gNB-CU 505 further split into gNB-CU-CP 515 an gNB-CU-UP 520 inter-connected via an E1 connection 525. The gNB-CU-CP 515 with the UE control plane context and the associated NG-C connections to the 5GC for a UE in the RRC inactive state. While the gNB-CU-UP with the UE user plane context and the associated NG-U connections to the 5GC for a UE in RRC inactive state. The gNB-CU-CP 515 may be connected with the gNB-DU 510 via an F1-C connection 530. The gNB-CU-UP 520 may also be connected with the gNB-DU 510 via an F1-U connection 535.

The user data transmission without state transition may not be supported for the UE in RRC inactive state (e.g., as was defined in NR Rel-16). That is, UE may transition or change its state to enter RRC_CONNECTED state first and then initiate the user data transmission. To achieve this, RRC resume process with considerable signaling consumption may be performed, even when the UE only has small or sporadic data to transmit. As such, user data transmission with state transition for RRC_INACTIVE UE may lead to unjustified signaling overhead and relative large transmission delay.

To tackle the issue arising from data transmissions, small data transmission for UE in the RRC inactive state (e.g., as supported in NR Rel-17) may be leveraged. A UE in the RRC inactive state may send one or more small data bursts during random access process or in pre-configured grants (CG). With those methods, the small data of user packets may be sent to an anchor node or an non-anchor node, thereby making use of data forwarding that is used.

Under other approaches, GTP-U tunnels may be set up over Xn-U or F1-U or NG-U interfaces for UL and DL user data forwarding that may consume dedicated TNL resources and TEID addressed. While setting up such tunnels may be warranted for large or continuous user packet transmission and relevant data forwarding, it may cause waste of TNL resources for small or sporadic data transmission. To handle this issue, the present systems and methods may perform data forwarding without setting up a GTP-U tunnel.

The XnAP/F1AP UE associated or non-associated procedures or messages used during RRC resume process may be reused to piggyback or transfer one or multiple user packets for data forwarding purposes, instead of using GTP-U tunnel. The relied-upon XnAP/F1AP messages include at least the following: (1) XnAP: RETRIEVE UE CONTEXT REQUEST; (2) XnAP: RETRIEVE UE CONTEXT RESPONSE; (3) XnAP: RETRIEVE UE CONTEXT FAILURE; (4) XnAP: RRC TRANSFER; (5) F1AP: UE CONTEXT MODIFICATION REQUEST; (6) F1AP: UE CONTEXT MODIFICATION RESPONSE; (7) F1AP: UE CONTEXT MODIFICATION REQUIRED; (8) F1AP: UE CONTEXT MODIFICATION CONFIRM; (9) F1AP: INITIAL UL RRC MESSAGE TRANSFER; (10) F1AP: DL RRC MESSAGE TRANSFER; and (11) F1AP: UL RRC MESSAGE TRANSFER, among others. In some embodiments, a new class 2 procedure or message (e.g., XnAP: USER DATA TRANSFER or F1AP: USER DATA TRANSFER) may be used to transfer the user packets for data forwarding purpose, instead of using GTP-U tunnel. The new message may be applicable for both directions between peer nodes Furthermore, the system can introduce a new information element (IE) field, such as a "User Data Container" (type OCTET STRING) in above impacted messages. The user packets to be forwarded may be included in the IE "User Data Container" by the sending node. Upon receipt, the user packet(s) may be extracted out of the IE "User Data Container" by the receiving node. The receiving node may also continue forwarding the received user packets to next node.

In some embodiments, besides the user packets, the associated DRB identifier, PDU session identifier, or Quality of Service (QoS) Flow information identifier information may be also included by the sending node. In this manner, the receiving node may identify which DRB, PDU session, or QoS Flow the received user packets belongs to for the purposes of distinction. In some embodiments, besides the user packets, the associated sequence number (SN), hyper frame number (HFN), count value information can be also included by the sending node. In this manner, the receiving node may identify the sequence or order of the received user packets for in-sequence delivery purpose.

If the gNB-CU is split further into gNB-CU-CP and gNB-CU-UP entity (e.g., as in system 500), the E1 connection (e.g., the E1 connection 525) may be setup between the gNB-CU-CP and the gNB-CU-UP. To let the gNB-CU-CP obtain the user packets that are to be forwarded, E1AP UE associated procedures or messages may be reused to piggyback or transfer the user packets for data forwarding purpose. The leveraged messages may include at least following: (1) E1AP: BEARER CONTEXT MODIFICATION REQUEST; (2) E1AP: BEARER CONTEXT MODIFICATION RESPONSE; (3) E1AP: BEARER CONTEXT MODIFICATION REQUIRED; or (4) E1AP: BEARER CONTEXT MODIFICATION CONFIRM, among others. In some embodiments, a new class2 procedure or message (e.g. E1AP: USER DATA TRANSFER) may be used to transfer the user packets for data forwarding purpose. The new message is applicable for both directions between gNB-CU-CP and gNB-CU-UP.

Furthermore, a new IE field (e.g. "User Data Container" (type OCTET STRING)) may be introduced or added in the above listed messages. The user packets that are to be forwarded may be included in the IE "User Data Container" by the sending node, and the user packets may be extracted out of the IE "User Data Container" by the receiving node. Furthermore, beside the user packets, the associated DRB identifier, PDU session identifier, and the QoS Flow identifier information may be also included by the sending node. In this manner, the receiving node may identify which DRB, PDU session, QoS Flow the received user packets belongs to for purports of distinction. Furthermore, besides the user packets, the associated sequence number (SN), HFN, or count value information may be also included by the sending node. In this manner, the receiving node may identify the sequence or order of the received user packets for in-sequence delivery purposes.

Figure 6:
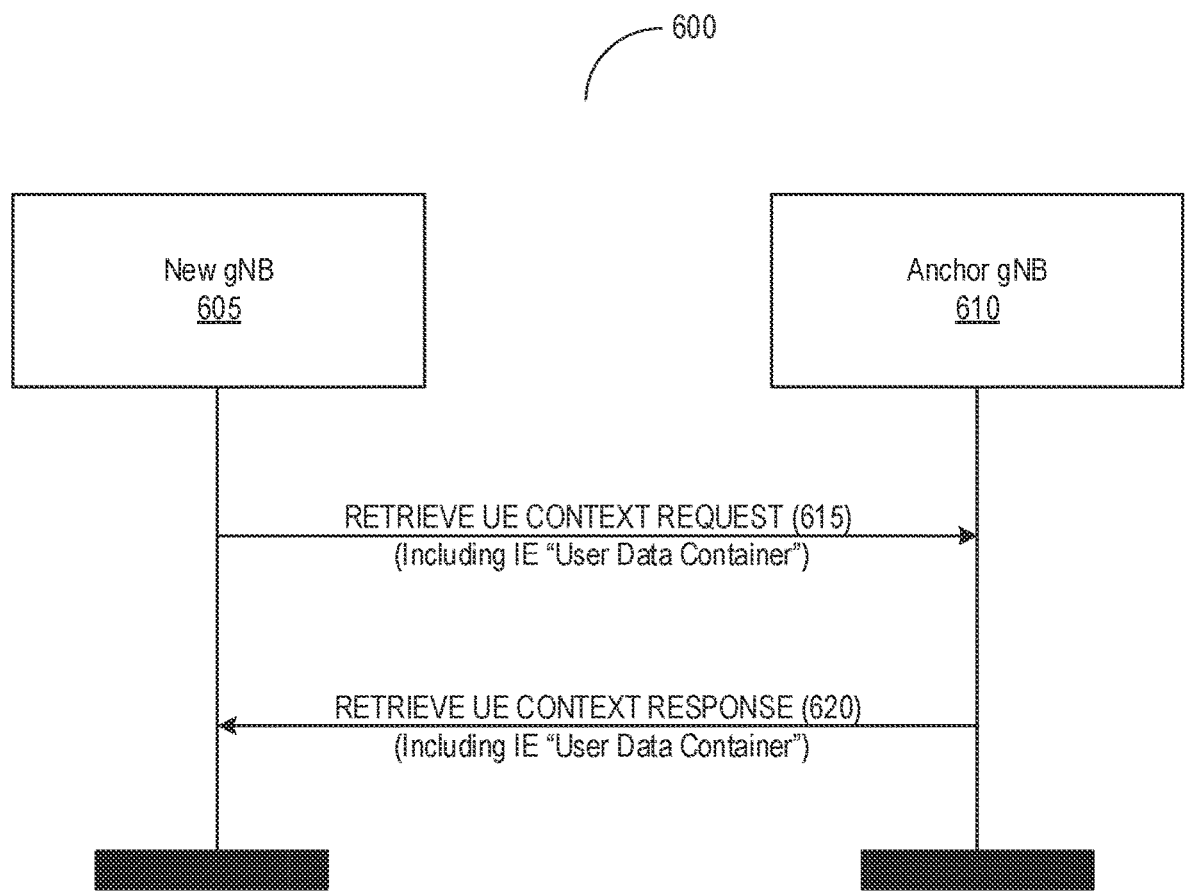
FIG. 6 illustrates a sequence diagram of a process of providing user equipment (UE) context via a retrieve UE context response message in accordance with an illustrative embodiment.

Referring now to FIG. 6, depicted is a sequence diagram of a process 600 of providing user equipment (UE) context via a retrieve UE context response message. In process 600, a UE in RRC_INACTIVE state may have one small UL user packet to transmit to the network. To that end, UE may access current camping NR cell in the new gNB 605 (that is in communication with an anchor gNB 610) and may perform RRC Resume procedure containing UL user packet over the air interface. The new gNB 605 may obtain the UL user packet and can only decode the UL user packet into one UL PDCP PDU based on local partial UE context.

The new gNB 605 may initiate the UE context fetch procedure by sending an XnAP: RETRIEVE UE CONTEXT REQUEST message to the anchor gNB 610 (615). The message may include the decoded UL PDCP PDU (as well as the associated DRB identifier and SN or HFN) in the IE "User Data Container." The new gNB 605 may forward the UL PDCP PDU to anchor gNB 610.

Upon receipt, the anchor gNB 610 may identify the UE context based on the UE Context ID and may verify the UE based on the integrity protection contained in the RETRIEVE UE CONTEXT REQUEST message. When the UE context is identified and the UE is successfully verified, the anchor gNB 610 may obtain the UL PDCP PDU (as well as the associated DRB id and SN or HFN) included in the IE "User Data Container." Because the anchor gNB 610 may decide to provide the UE context to the new gNB 605, i.e. anchor relocation, it shall respond to the new gNB 605 with the XnAP: RETRIEVE UE CONTEXT RESPONSE message. The anchor gNB 610 may include the UL PDCP PDU in the IE "User Data Container" in RETRIEVE UE CONTEXT RESPONSE message, to transfer the message back to the new gNB 605 (620). Also the anchor gNB may transfer the full UE context in RETRIEVE UE CONTEXT RESPONSE message.

The new gNB 605 may obtain the full UE context with RETRIEVE UE CONTEXT RESPONSE message. Using the full UE context, the new gNB 605 can decode the UL PDCP PDU further to PDCP SDU and corresponding QoS Flow packet. After successful anchor relocation to the new gNB 605 with the path switch procedure, the new gNB 605 shall send the UL user packet to UPF via corresponding NG-U tunnel.

Figure 7:
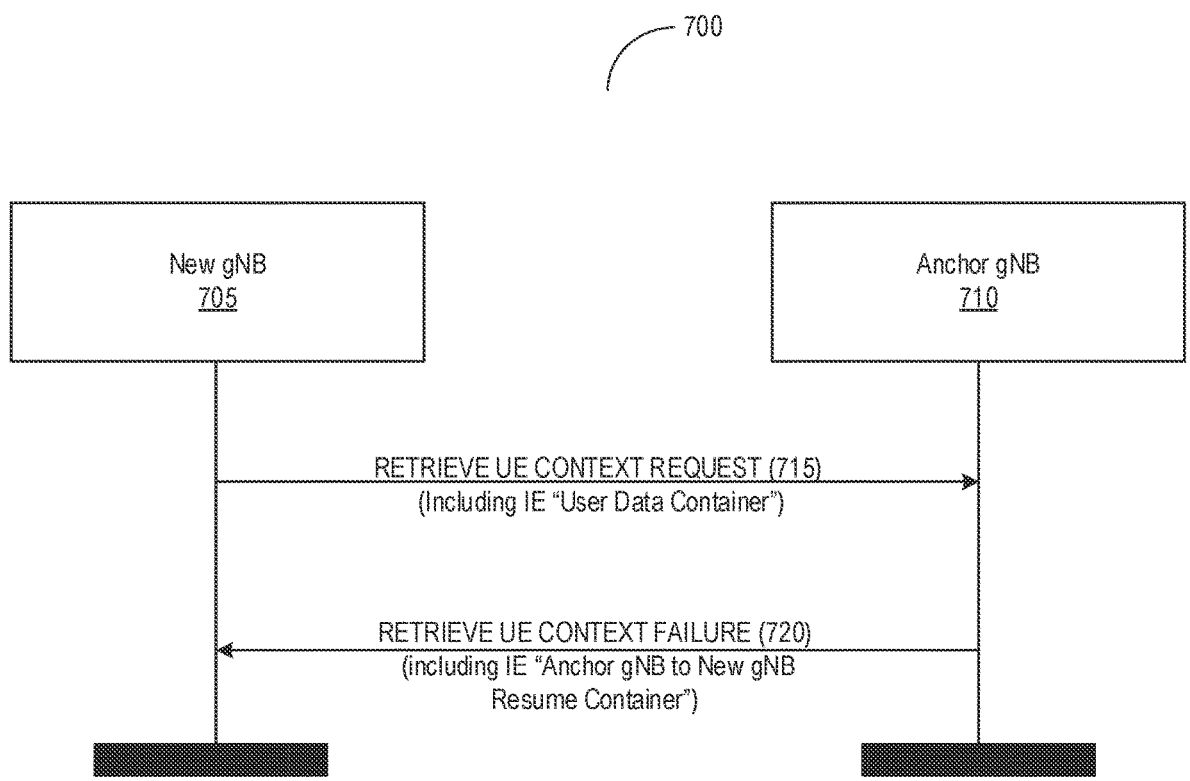
FIG. 7 illustrates a sequence diagram of a process of providing user equipment (UE) context via a retrieve UE context failure message in accordance with an illustrative embodiment.

FIG. 7 illustrates a sequence diagram of a process 700 of providing user equipment (UE) context via a retrieve UE context failure message. Under the process 700, a UE in RRC_INACTIVE state may have one small UL user packet to transmit to network. To that end, the UE may access current camping NR cell in the new gNB 705 (that may be in connection with an anchor gNB 710) and may perform a RRC Resume procedure containing UL user packet over the air interface. The new gNB 705 may obtain the UL user packet and can only decode the user packet into one UL PDCP PDU based on local partial UE context.

The new gNB 705 may initiate the UE context fetch procedure by sending XnAP: RETRIEVE UE CONTEXT REQUEST message to the anchor gNB 710 of the UE (715). The message may include the decoded UL PDCP PDU (as well as the associated DRB identifier and SN or HFN) in the IE "User Data Container". The new gNB 705 may forward the UL PDCP PDU to anchor gNB 710.

Upon receipt, the anchor gNB 710 may identify the UE context based on the UE Context ID and may verify the UE based on the integrity protection contained in the RETRIEVE UE CONTEXT REQUEST message. If the UE context can be identified and the verification is successful, the anchor gNB 710 may obtain the UL PDCP PDU (as well as the associated DRB identifier and SN or HFN) included in the IE "User Data Container". Because the anchor gNB 710 may decide not to provide the UE context to the new gNB 705 (e.g., no anchor relocation), the anchor gNB 710 may respond to the new gNB 705 with the XnAP: RETRIEVE UE CONTEXT FAILURE message (720). The anchor gNB 710 may keep the UL PDCP PDU, instead of transferring the PDU back to the new gNB 705.

The anchor gNB 710 may decode the received UL PDCP PDU further to PDCP SDU and to the corresponding QoS Flow packet. Without anchor relocation to the new gNB 705, the anchor gNB 710 may send the UL user packet to UPF via a corresponding NG-U tunnel. The new gNB 705 may obtain the IE "anchor gNB to new gNB Resume Container" with RETRIEVE UE CONTEXT FAILURE message. The new gNB may transparently forward the content of this IE to the UE.

Figure 8:
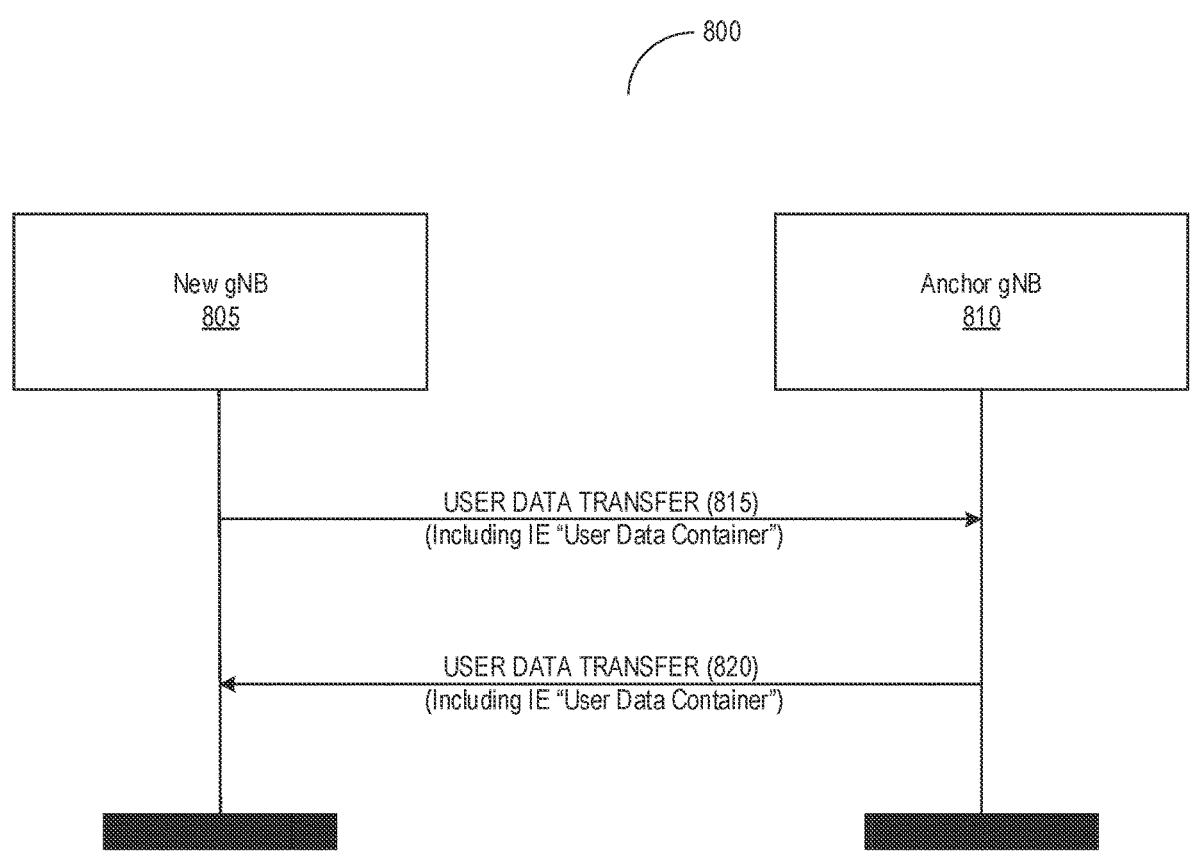
FIG. 8 illustrates a sequence diagram of a process of providing user equipment (UE) context via a user data transfer message in accordance with an illustrative embodiment.

FIG. 8 illustrates a sequence diagram of a process 800 of providing user equipment (UE) context via a user data transfer message. Under process 800, a UE in the RRC_INACTIVE state may have one small UL user packet to transmit to network. To that end, the UE may access current camping NR cell in the new gNB 805 (in communication with an anchor gNB 810) and may perform direct UL user packet transmission without RRC Resume procedure over the air interface. The new gNB 805 may obtain the UL user packet and can only decode the UL user packet into one UL PDCP PDU based on local partial UE context.

The new gNB 805 may not initiate the UE context fetch procedure but sends XnAP USER DATA TRANSFER message to the anchor gNB 810 of the UE (815). The message may include the decoded UL PDCP PDU (as well as the associated DRB id and SN or HFN) in the IE "User Data Container." The new gNB 805 may forward the UL PDCP PDU to anchor gNB 810.

The anchor gNB 810 may identify the UE context based on the UE Context ID and may verify the UE based on the integrity protection contained in the USER DATA TRANSFER message. When the UE context is identified and the UE is successfully verified, the anchor gNB 810 may obtain the UL PDCP PDU (as well as the associated DRB id and SN or HFN) included in the IE "User Data Container". Because the anchor gNB 810 may decide not to provide the UE context to the new gNB 805 (e.g., no anchor relocation), the anchor gNB 810 may respond to the new gNB 805 with the XnAP: USER DATA TRANSFER message (820). The message may include DL user packet. The anchor gNB 810 may keep the UL PDCP PDU, instead of transfer the PDU to the new gNB 805.

The anchor gNB 810 may decode the received UL PDCP PDU further to PDCP SDU and corresponding QoS Flow packet. Without anchor relocation to new gNB 805, the anchor gNB 810 may send the UL user packet to UPF via corresponding NG-U tunnel. The new gNB 805 may obtain the DL user packet if any included in the IE "User Data Container" with USER DATA TRANSFER message. The new gNB 805 may also transmit the DL user packet to the UE.

Figure 9:
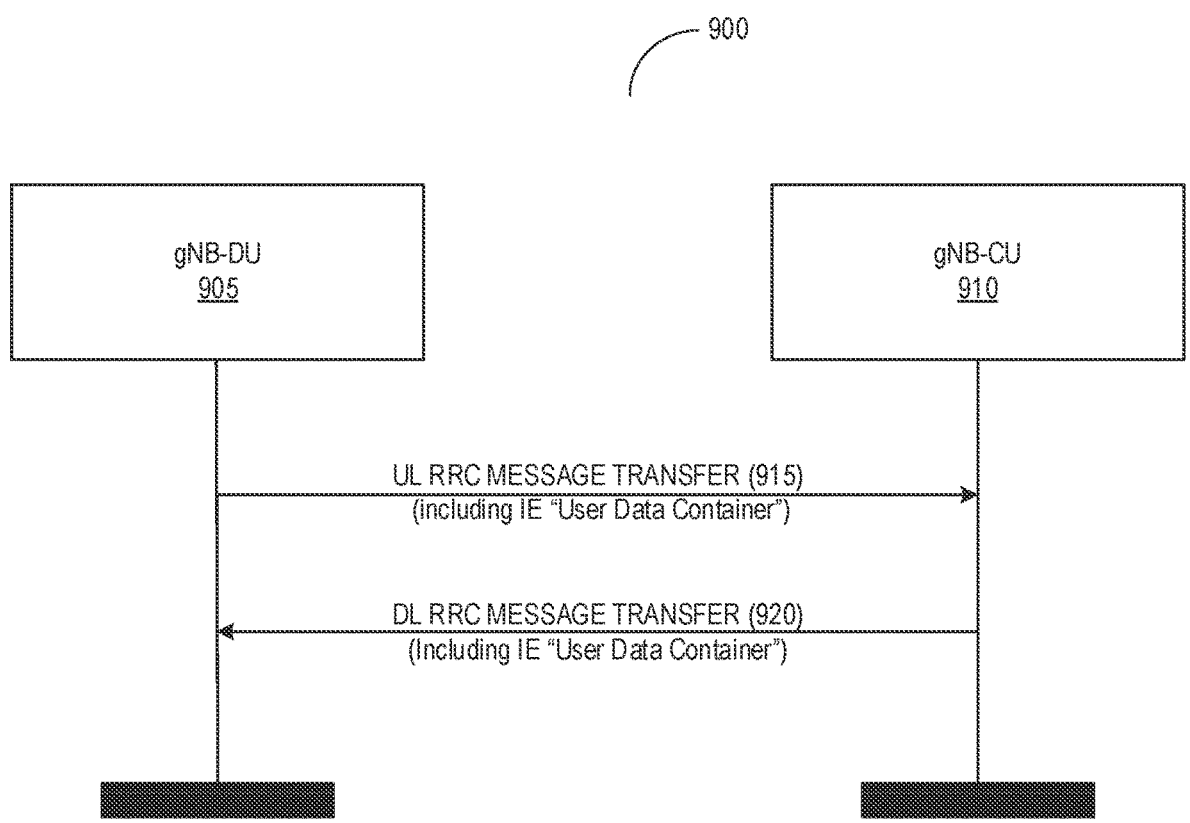
FIG. 9 illustrates a sequence diagram of a process of providing user equipment (UE) context via a downlink (DL) radio resource control (RRC) transfer message in accordance with an illustrative embodiment.

FIG. 9 illustrates a sequence diagram of a process 900 of providing user equipment (UE) context via a downlink (DL) radio resource control (RRC) transfer message. In the process 900, the UE in the RRC INACTIVE state may have one small UL user packet to transmit to network. To that end, UE may access current camping NR cell in the gNB-DU 905 and may perform RRC Resume procedure containing UL user packet over the air interface. The gNB-DU 905 may obtain the UL user packet and may only decode the user packet into one UL PDCP PDU based on local partial UE context.

The gNB may receive a UL user packet from an radio interface. A UE-associated logical F1-connection for the UE may exist. Upon receipt, the gNB-DU 905 may send an F1AP: UPLINK RRC MESSAGE TRANSFER message to the gNB-CU 910 (915). The message may include the UL PDCP PDU (as well as the associated DRB identifier and SN or HFN) in the User Data Container IE. The gNB-DU 905 may forward the UL PDCP PDU to gNB-CU 910.

The gNB-CU 910 may have the full UE context, and can decode the UL PDCP PDU further to PDCP SDU and corresponding QoS Flow packet. The gNB-CU 910 may also continue the UL data forwarding over Xn interface towards other neighboring gNB s.

The gNB-CU 910 may have a DL user packet to transmit. The gNB-CU 910 can encode the DL user packet into DL PDCP PDU and then include DL PDCP PDU (as well as its associated DRB identifier and SN/HFN) in the IE "User Data Container" with F1AP: DL RRC MESSAGE TRANSFER message. The gNB-CU 910 may send the F1AP: DL RRC MESSAGE TRANSFER message to the gNB-DU 905 (920). Upon receiving, the gNB-DU 905 may transmit the DL PDCP PDU to the UE together with DL RRC message.

Figure 10:
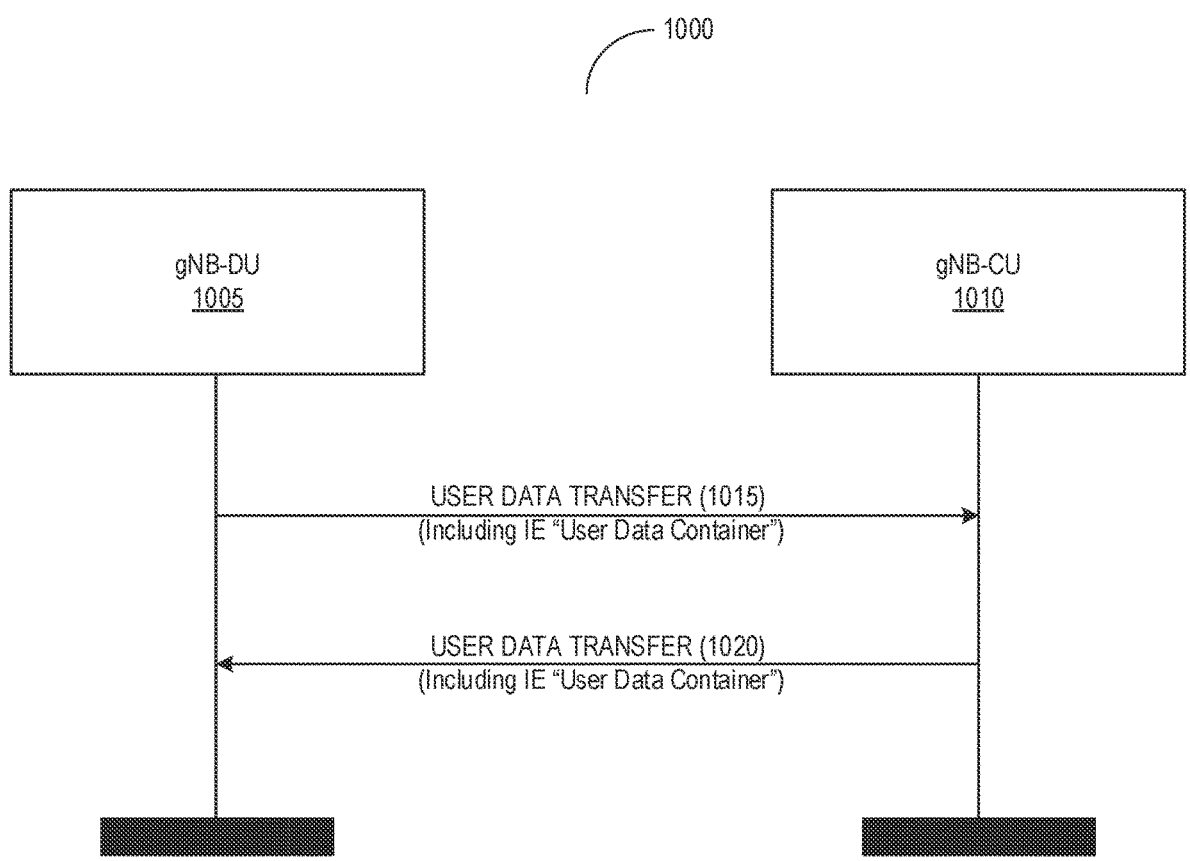
FIG. 10 illustrates a sequence diagram of a process of providing user equipment (UE) context via a user data transfer message in a centralized unit (CU) and distributed unit (DU) split architecture in accordance with an illustrative embodiment.

FIG. 10 illustrates a sequence diagram of a process 1000 of providing user equipment (UE) context via a user data transfer message in a centralized unit (CU) and distributed unit (DU) split architecture. Under the process 1000, a UE in the RRC_INACTIVE state may have a small UL user packet to transmit to network. To that end, the UE may access current camping NR cell in the gNB-DU 1005 and may perform direct UL user packet transmission without RRC Resume procedure over the air interface. The gNB-DU 1005 may obtain the UL user packet and can only decode the UL user packet into one UL PDCP PDU based on the local partial UE context.

The gNB-DU 1005 may receive an UL user packet from a radio interface. A UE-associated logical F1-connection for the UE may exist. Upon receipt, the gNB-DU 1005 may send the F1AP: USER DATA TRANSFER message to the gNB-CU 1010 (1015). The message may include the UL PDCP PDU (as well as the associated DRB id and SN or HFN) in the User Data Container IE. The gNB-DU 1005 may forward he UL PDCP PDU to gNB-CU 1010.

The gNB-CU 1010 may have the full UE context. Using the full UE context, the gNB-CU 1010 can decode the UL PDCP PDU further to PDCP SDU and corresponding QoS Flow packet. The gNB-CU 1010 may continue the UL data forwarding over Xn interface towards other neighboring gNBs.

The gNB-CU 1010 may have a DL user packet to transmit. The gNB-CU 1010 may encode the DL user packet into DL PDCP PDU and then includes the DL PDCP PDU (as well as the associated DRB identifier and SN or HFN) in the IE "User Data Container" with F1AP: USER DATA TRANSFER message. The gNB-CU 1010 may send the F1AP: USER DATA TRANSFER message to the gNB-DU 1005 (1020). Upon receiving, the gNB-DU 1005 may transmit the DL PDCP PDU to the UE.

Figure 11:
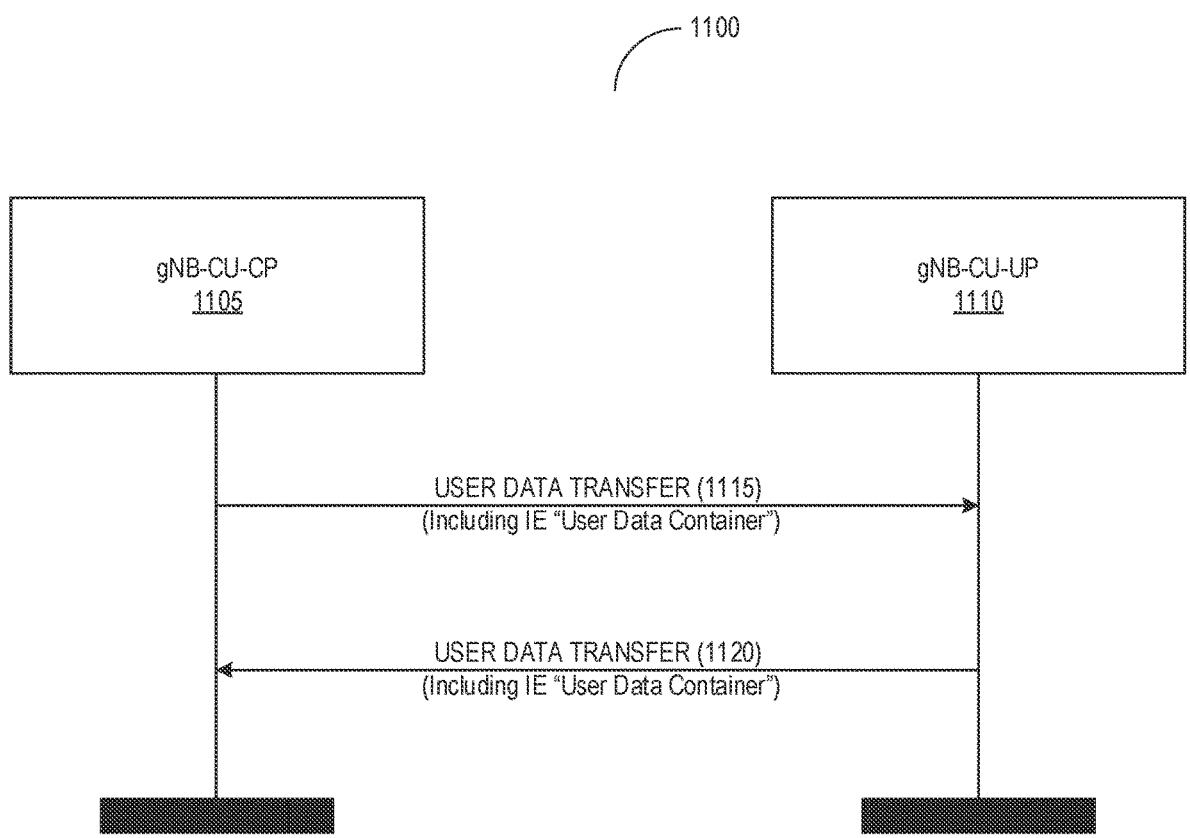
FIG. 11 illustrates a sequence diagram of a process of providing user equipment (UE) context via a user data transfer message between a control plane (CU) and a user plane (UP) in accordance with an illustrative embodiment.

FIG. 11 illustrates a sequence diagram of a process 1100 of providing user equipment (UE) context via a user data transfer message between a control plane (CU) and a user plane (UP). Under the process 1100, a UE in RRC_INACTIVE state may have one small UL user packet to transmit to network. To that end, the UE may access current camping NR cell in the gNB-DU and may perform direct UL user packet transmission without RRC Resume procedure over the air interface. The gNB-CU-CP 1105 may obtain the UL user packet from gNB-DU over F1AP message and can only decode the message into one UL PDCP PDU based on local partial UE context.

The gNB-CU-DP may receive an UL user packet from a gNB-DU. A UE-associated logical E1-connection may exist for the UE. Upon receipt, the gNB-CU-CP 1105 may send a E1AP: USER DATA TRANSFER message to the gNB-CU-UP 1110 (1115). The message may include the UL PDCP PDU (as well as the associated DRB identifier and SN or HFN) in the User Data Container IE. The gNB-CU-CP 1105 may forward the UL PDCP PDU to gNB-CU-UP 1110.

The gNB-CU-UP 1110 may have the full UE context. Using the full UE context, the gNB-CU-UP 1110 can decode the UL PDCP PDU further to PDCP SDU and corresponding QoS Flow packet. The gNB-CU-UP 1110 may also continue the UL data forwarding over Xn interface towards other neighboring gNBs.

The gNB-CU-UP 1110 may have a DL user packet to transmit. The gNB-CU-UP 1110 may encode the DL user packet into DL PDCP PDU and then includes the DL PDCP PDU (as well as the associated DRB identifier and SN or HFN) in the IE "User Data Container" with E1AP: USER DATA TRANSFER message. The gNB-CU-UP 1110 may send the E1AP: USER DATA TRANSFER message to the gNB-CU-UP 1110 (1120). Upon receiving, the gNB-CU-CP 1105 may transmit the DL PDCP PDU to the gNB-DU, and then further to UE.

Figure 12:
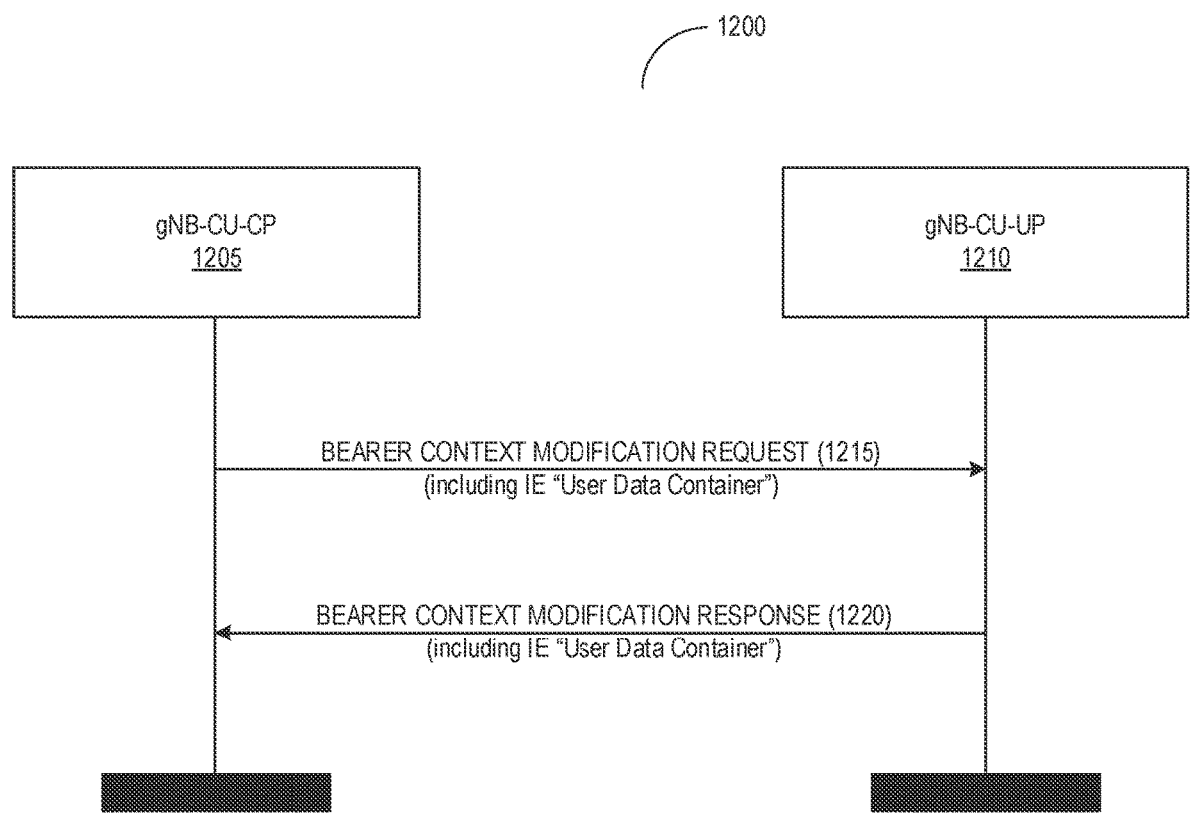
FIG. 12 illustrates a sequence diagram of a process of providing user equipment (UE) context via a bearer context modification response in accordance with an illustrative embodiment.

FIG. 12 illustrates a sequence diagram of a process 1200 of providing user equipment (UE) context via a bearer context modification response. Under the process 1200, UE in RRC_INACTIVE state has one small UL user packet to transmit to network, hence UE accesses current camping NR cell in the gNB-DU and performs RRC Resume procedure containing UL user packet over air. The gNB-CU-CP 1205 eventually obtains the UL user packet from gNB-DU over F1AP message and can only decode it into one UL PDCP PDU based on local partial UE context.

The gNB-CU-CP 1205 may receive an UL user packet from a gNB-DU. A UE-associated logical E1-connection for the UE may exist. Upon receipt, the gNB-CU-CP 1205 may send the E1AP: BEARER CONTEXT MODIFICATION REQUEST message to the gNB-CU-UP 1210 (1215). The message may include the UL PDCP PDU (as well as the associated DRB identifier and SN or HFN) in the User Data Container IE. The gNB-CU-CP 1205 may forward the UL PDCP PDU to gNB-CU-UP 1210.

The gNB-CU-UP 1210 may have the full UE context. Using the full UE context, the gNB-CU-UP 1210 can decode the UL PDCP PDU further to PDCP SDU and corresponding QoS Flow packet. The gNB-CU-UP 1210 can continue the UL data forwarding over Xn interface towards other neighboring gNB.

The gNB-CU-UP 1210 may have one DL user packet to transmit. The gNB-CU-UP 1210 may encode into DL PDCP PDU and then includes the DL PDCP PDU (as well as the associated DRB identifier and SN or HFN) in the IE "User Data Container" with E1AP: BEARER CONTEXT MODIFICATION RESPONSE message. The gNB-CU-UP 1210 may send the h E1AP: BEARER CONTEXT MODIFICATION RESPONSE message to the gNB-CU-CP 1205 (1220). Upon receiving, the gNB-CU-CP 1205 may transmit the DL PDCP PDU to the gNB-DU, and then further forward to UE.

Figure 13:
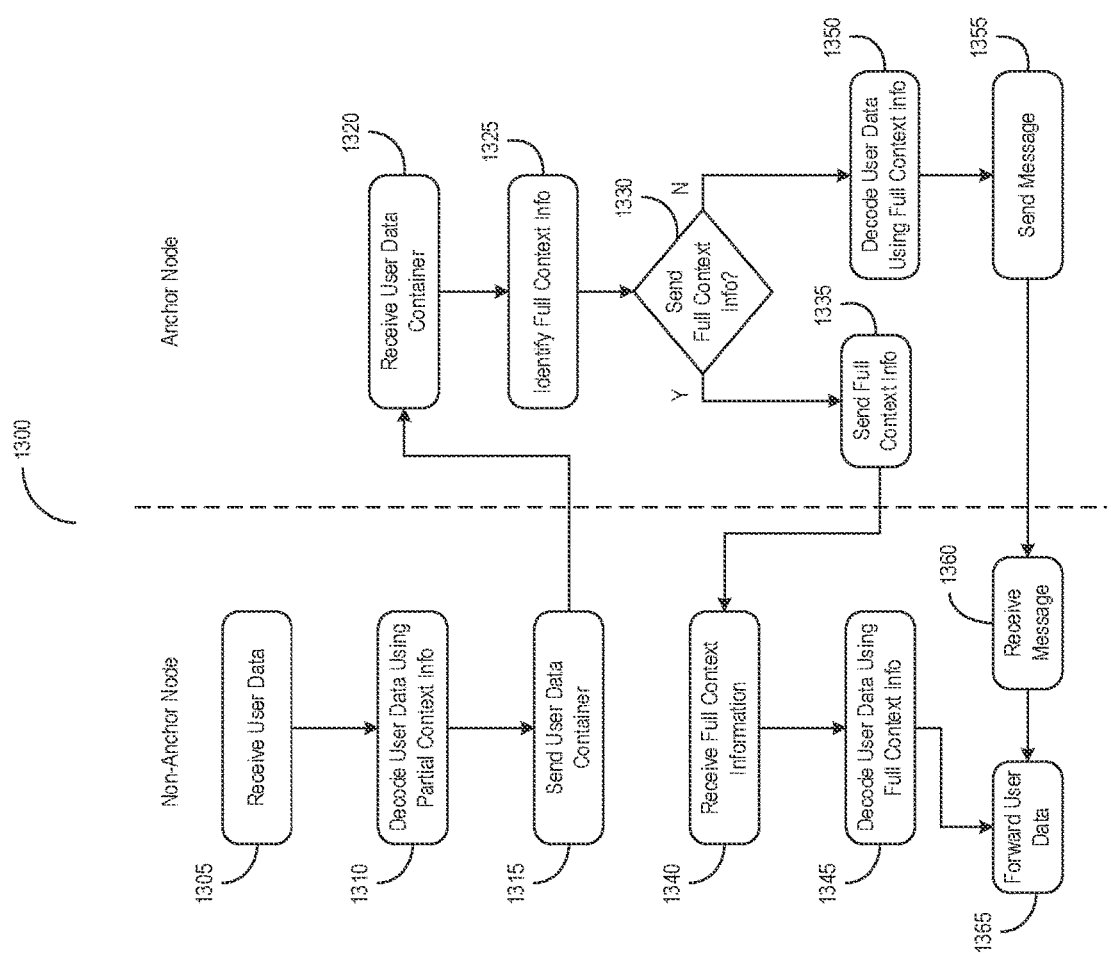
FIG. 13 illustrates a functional band diagram of a method of data forwarding for user equipment with data transmission in accordance with an illustrative embodiment.

FIG. 13 illustrates a functional band diagram of a method 1300 of data forwarding for user equipment with data transmission. The method 1300 may be performed or implemented using any of the components detailed herein in conjunction with FIGS. 1-12. In brief overview, a non-anchor node may receive user data (1305). The non-anchor node may decode user data using partial context information (1310). The non-anchor node may send a user data container (1315). The anchor node may receive the user data container (1320). The anchor node may identify full context information (1325). The anchor node may determine whether to send full context information (1330). If the determination is to send the full context information, the anchor node may send the full context information (1335). The non-anchor node may receive the full context information (1340). The non-anchor node may decode the user data using the full context information (1345). If the determination is to not send the full context information, the anchor node may decode the user data using the full context information (1350). The anchor node may send a message (1355). The non-anchor node may receive the message (1360). The non-anchor node may forward the user data (1365).

In further detail, a non-anchor node may retrieve, identify, receive user data of a wireless communication device (e.g., UE 104) (1305). The non-anchor node may be part of a gNB (e.g., BS 102), and the wireless communication device may have establish a communication with the gNB in accordance with the radio resource control (RRC) protocol. In some embodiments, the wireless communication device from which the user data is received may be in an RRC inactive state. When in the RRC inactive state, the wireless communication device may at least temporarily suspend the communications session with the gNB. The data transmitted by the wireless communication device may correspond to small data (e.g., small packets or payload, such as those below a defined data size). For example, the size of the data may be less than a 100 bytes. The data transmitted by the wireless communication device may also be sporadic. For example, the wireless communication device may send the data once at a rate between 1 minute or greater.

In some embodiments, the non-anchor node may receive the user data from the wireless communication device in conjunction with or after initiating the RRC connection resume procedure. The RRC connection resume procedure may be to resume a suspended RRC connection with a signaling radio bearer (SRB) or a dedicated radio bearer (DRB). The wireless communication device may send the user data to the non-anchor node in conjunction with or subsequent to initiating the RRC resume procedure with the non-anchor node (or the gNB). In some embodiments, the non-anchor node may receive the user data without RRC signaling from the wireless communication while in the RRC inactive state. The wireless communication may send the user data to the non-anchor node (or the gNB) without initiating the RRC resume procedure (and by extension, without RRC signaling).

The non-anchor node may process or decode the user data using partial context information (1310). The non-anchor node may have a portion (e.g., less than all) of the context information of the wireless communication device. The context information may include, for example, information for forwarding of the user data from the wireless communication device. The non-anchor node may decode the user data into an uplink air interface protocol protocol data unit (PDU) using the partial portion of the context information of the wireless communication device. The uplink air interface protocol may include, for example, F1 application protocol (F1AP), Xn application protocol (XnAP), E1 application protocol (E1AP), among others. The PDU may be a unit of data (e.g., a packet) for communication of data. The uplink air interface protocol PDU may include the user data decoded using the portion of the context information.

The non-anchor node may provide, transmit, or otherwise send a user data container to an anchor node (1315). The non-anchor node may send the uplink air interface protocol PDU in the user data container of a message to the anchor node. In some embodiments, the non-anchor node may generate the user data container for the message to include the uplink air interface protocol PDU decoded from the user data of the wireless communication device. The user data container may identify or include one or more parameters or identifications for the context information of the wireless communication device to be retrieved from the anchor node. The anchor node may retrieve, identify, or otherwise receive the user data container (1320). The anchor node may receive the uplink air interface protocol PDU in the user data container of the message from the non-anchor node.

In some embodiments, the user data container may include an information element (IE). The IE may include the user data container itself. In some embodiments, the user data container may include an identification of the wireless communication device. The identification may uniquely identify or reference the wireless communication device using a network address or a device identifier. In some embodiments, the user data container may include an identification of context information of the wireless communication device. The identification may uniquely identify or reference the context information for forwarding data associated with the wireless communication device.

In some embodiments, the user data container may include an identification of a data radio bearer (DRB) associated with the uplink air interface protocol PDU. The identification may uniquely identify or reference the DRB associated with the uplink air interface protocol PDU. In some embodiments, the user data container may include an identification of a PDU session associated with the uplink air interface protocol PDU. The identification may uniquely identify or reference the PDU session to be used in connection with the uplink air interface protocol PDU. In some embodiments, the user data container may include an identification of an associated quality of service (QoS) flow. The identification of the associated QoS flow may define the QoS flow to be used for data forwarding for the wireless communication device.

In some embodiments, the user data container may include a sequence number (SN) associated with the uplink air interface protocol PDU. The sequence number may define or specify an order of user packets to be communication. In some embodiments, the user data container may include a hyper frame number (HFN) associated with the uplink air interface protocol PDU. The HFN may define or specify times or frame numbers at which user packets are to be communicated. In some embodiments, the user data container may include a count value associated with the uplink air interface protocol PDU. The count value may define or specify the value for the number of user packets to be communicated.

The anchor node may retrieve, find, or otherwise identify full context information (1325). The anchor node may store, maintain, or otherwise have the full context information of the wireless communication device. For example, the anchor node may have information on device type, network traffic, mobility, and other characteristics in relation with the wireless communication device. The identification of the full context information may be in response to receipt of the user data container in the message from the non-anchor node. In accordance with the specifications defined in the user data container, the anchor node may identify the full context information for the wireless communication device. For example, the anchor node may find the full context information corresponding to the identification of the DRB and the identification of the PDU session.

The anchor node may determine whether to send full context information (1330). The determination of whether to send the full context information may be in accordance with a radio resource management (RRM) policy or algorithm. The RRM policy may specify conditions under which to perform an anchor relocation from the anchor node to the non-anchor node or otherwise provide the full context information to the non-anchor node. The conditions of the RRM policy may identify or include, for example, radio resource allocations, network traffic characteristics (e.g., transmission power and data rates), beamforming parameters, diversity, and handover criteria, among others, under which the anchor relocation is to be performed. In some embodiments, the determination by the anchor node may be depend on the architecture (e.g., as described herein in conjunction with FIGS. 3-12) in accordance to which the non-anchor node and the anchor node operate. When the determination is to send the full context information, the anchor node may determine to perform anchor relocation to the non-anchor node. On the other hand, when the determination is not to send the full context information, the anchor node may determine to not perform anchor relocation.

If the determination is to send the full context information, the anchor node may provide, transmit, or otherwise send the full context information to the non-anchor node (1335). With the identification, the anchor node may send the uplink air interface protocol PDU in a user data container in a message with the full context information of the wireless communication device. The uplink air interface protocol may include, for example, F1 application protocol (F1AP), Xn application protocol (XnAP), E1 application protocol (E1AP), among others. In some embodiments, the non-anchor node may generate the user data container for the message to include the uplink air interface protocol PDU with the full context information of the wireless communication device. The non-anchor node may retrieve, identify, or otherwise receive the full context information from the anchor node (1340). The non-anchor node may in turn receive the uplink air interface protocol PDU in the user data container of the message with the full context information of the wireless communication device. Upon receipt, the non-anchor node may parse the user data container of the message to identify the full-context information of the wireless communication device.

The non-anchor node may process or decode the user data using the full context information (1345). Using the full context information of the wireless communication device, the non-anchor node may decode the uplink air interface protocol PDU into an air interface protocol service data unit (SDU) or a quality of service (QoS) flow packet. By decoding, the non-anchor node may generate the air interface SDU or the QoS flow packet corresponding to the user data. In some embodiments, the decoding of the uplink air interface protocol PDU to the air interface protocol SDU may be prior to the decoding of the uplink air interface protocol PDU to the QoS flow packet. The air interface protocol SDU may correspond to a set of data passed from one layer to another layer, not yet encapsulated by the lower layer. In some embodiments, the non-anchor node may store and maintain the full context information of the wireless communication device. In performing the anchor relocation, the non-anchor node, now having the full context information, may transition to an anchor node for the wireless communication device.

If the determination is to not send the full context information, the anchor node may decode the user data using the full context information (1350). Using the full context information, the anchor node may decode the uplink air interface protocol PDU into an air interface protocol service data unit (SDU) or a quality of service (QoS) flow packet. By decoding, the anchor node may generate the air interface SDU or the QoS flow packet corresponding to the user data. In some embodiments, the decoding of the uplink air interface protocol PDU to the air interface protocol SDU may be prior to the decoding of the uplink air interface protocol PDU to the QoS flow packet.

The anchor node may provide, transmit, or otherwise send a message to the non-anchor node (1355). In some embodiments, the anchor node may send a RRC resume container in the message without the context information of the wireless communication device to the non-anchor node. The RRC resume container may be include in a message communicated after initiation of the RRC connection resume procedure. The anchor node may generate the RRC resume container to include the decoded air interface protocol PDU in the form of the air interface protocol SDU or QoS flow packet. The content of the RRC resume container may include the air interface protocol SDU or QoS flow packet. In some embodiments, the anchor node may send a user data container in the message, without the context information of the wireless communication device to the non-anchor node. In some embodiments, the anchor node may generate the user data container to include the decoded air interface protocol PDU in the form of the air interface protocol SDU or QoS flow packet. The content of the user data container may include the air interface protocol SDU or QoS flow packet.

The non-anchor node may retrieve, identify, or otherwise the receive the message (1360). In some embodiments, the non-anchor node may receive the RRC resume container in the message without the context information of the wireless communication device from the anchor node. The content of the RRC resume container received from the anchor node may include the air interface protocol SDU or QoS flow packet. In some embodiments, the non-anchor node may receive the user data container in the message without the context information of the wireless communication device from the anchor node.

The types of messages communicated between the non-anchor node and the anchor node in (1315), (1320), (1335), (1340), (1355), and (1360) may depend on the architecture (e.g., as described herein in conjunction with FIGS. 3-12). In some embodiments, the anchor node may correspond to or include a next generation Node B (gNB) or next-generation evolved node B (ng-eNB). The non-anchor node may correspond to or include gNB or ng-eNB. The message sent from the non-anchor node to the anchor node may include an Xn application protocol (XnAP) RETRIEVE UE CONTEXT REQUEST message or a XnAP RRC TRANSFER message. The message sent from the anchor node to the non-anchor node may include XnAP RETRIEVE UE CONTEXT RESPONSE message or a XnAP RRC TRANSFER message.

In some embodiments, the anchor node may correspond to or include a next generation Node B (gNB) or next-generation evolved node B (ng-eNB). The non-anchor node may correspond to or include a gNB or ng-eNB. The message sent from the non-anchor node to the anchor node may include an Xn application protocol (XnAP) RETRIEVE UE CONTEXT REQUEST message or a XnAP RRC TRANSFER message. The message sent from the anchor node to the non-anchor node may include an XnAP RETRIEVE UE CONTEXT FAILURE message or a XnAP RRC TRANSFER message.

In some embodiments, the anchor node may correspond to or include a next generation Node B (gNB) or next-generation evolved node B (ng-eNB). The non-anchor node may correspond to or include a gNB or ng-eNB. The message sent from the non-anchor node to the anchor node may include a Xn application protocol (XnAP) USER DATA TRANSFER message or a XnAP RRC TRANSFER message. The message sent from the non-anchor node to the anchor node may include a XnAP USER DATA TRANSFER message or a XnAP RRC TRANSFER message.

In some embodiments, the anchor node may correspond to or include a centralized unit (CU) of next generation Node B (gNB) or next-generation evolved node B (ng-eNB). The non-anchor node may correspond to or include a distributed unit (DU) of a second gNB or ng-eNB. The message sent from the non-anchor node to the anchor node may include a F1 application protocol (F1AP) UPLINK RRC MESSAGE TRANSFER message, or F1AP UE CONTEXT MODIFICATION REQUIRED message. The message sent from the non-anchor node to the anchor node may include an F1AP DOWNLINK RRC MESSAGE TRANSFER message, or F1AP UE CONTEXT MODIFICATION CONFIRM message.

In some embodiments, the anchor node may correspond to or include a centralized unit (CU) of next generation Node B (gNB) or next-generation evolved node B (ng-eNB). The non-anchor node may correspond to or include a distributed unit (DU) of a second gNB or ng-eNB. The message sent from the non-anchor node to the anchor node may include a F1 application protocol (F1AP) USER DATA TRANSFER message, F1AP UE CONTEXT MODIFICATION REQUIRED message, or F1AP INITIAL UL RRC MESSAGE TRANSFER message. The message sent from the non-anchor node to the anchor node may include a F1AP USER DATA TRANSFER message, F1AP UE CONTEXT MODIFICATION REQUEST message, or F1AP UE CONTEXT MODIFICATION CONFIRM message In some embodiments, the anchor node may correspond to or include a centralized unit user plane (CU-UP) of first next generation Node B (gNB) or next-generation evolved node B (ng-eNB). The non-anchor node may correspond to or include a centralized unit control plane (CU-CP) of a second gNB or ng-eNB. The message sent from the non-anchor node to the anchor node may include E1 application protocol (E1AP) USER DATA TRANSFER message or a E1AP BEARER CONTEXT MODIFICATION REQUEST message. The message sent from the non-anchor node to the anchor node may include a E1AP USER DATA TRANSFER message or a E1AP BEARER CONTEXT MODIFICATION REQUIRED message.

In some embodiments, the anchor node may correspond to or include a centralized unit user plane (CU-UP) of first next generation Node B (gNB) or next-generation evolved node B (ng-eNB). The non-anchor node may correspond to or include a centralized unit control plane (CU-CP) of a second gNB or ng-eNB. The message sent from the non-anchor node to the anchor node may include a E1 application protocol (E1AP) BEARER CONTEXT MODIFICATION REQUEST message, a first E1AP USER DATA TRANSFER message or a E1AP BEARER CONTEXT MODIFICATION CONFIRM message. The message sent from the non-anchor node to the anchor node may include an E1AP BEARER CONTEXT MODIFICATION RESPONSE message, a E1AP USER DATA TRANSFER message or a E1AP BEARER CONTEXT MODIFICATION REQUIRED message.

The non-anchor node may send, transmit, or otherwise forward the user data to the wireless communication device (1365). The user data forwarded to the wireless communication device may include the uplink air interface protocol PDU decoded to the air interface protocol SDU or the QoS flow packet. In some embodiments, the non-anchor node may forward the decoded uplink air interface protocol PDU (e.g., in the form of the air interface protocol SDU or the QoS flow packet) to the wireless communicate device. In some embodiments, upon receipt, the non-anchor node may parse the RRC resume container to identify the content. The content may include the air interface protocol SDU or the QoS flow packet decoded from the uplink air interface protocol PDU. The non-anchor node may send the content of the RRC resume container to the wireless communication device. In some embodiments, upon receipt, the non-anchor node may parse the user data container to identify the content. The content may include the air interface protocol SDU or the QoS flow packet decoded from the uplink air interface protocol PDU. The non-anchor node may send the content of the user data container to the wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
    receiving, by a non-anchor node, user data of a wireless communication device to send uplink;
    decoding, by the non-anchor node, the user data into an uplink air interface protocol protocol data unit (PDU), using a partial portion of context information of the wireless communication device;
    sending, by the non-anchor node, the uplink air interface protocol PDU in a user data container of a first message, to an anchor node having full context information of the wireless communication device; and
    receiving, by the non-anchor node, the uplink received air interface protocol PDU in a user data container of a second message, with the full context information of the wireless communication device in response to the anchor node determining that the full context information identified in accordance with the user data container is to be sent.

2. The method of claim 1, comprising:
    receiving, by the non-anchor node, the user data from the wireless communication device after initiating a radio resource control (RRC) connection resume procedure;
    decoding, by the non-anchor node using the full context information of the wireless communication device, the uplink air interface protocol PDU to at least one of: an air interface protocol service data unit (SDU) or a quality of service (QOS) flow packet.

3. The method of claim 2, wherein the anchor node comprises a first next generation Node B (gNB) or next-generation evolved node B (ng-eNB), the non-anchor node comprises a second gNB or ng-eNB, the first message comprises an Xn application protocol (XnAP) RETRIEVE UE CONTEXT REQUEST message or a first XnAP RRC TRANSFER message, and the second message comprises an XnAP RETRIEVE UE CONTEXT RESPONSE message or a second XnAP RRC TRANSFER message.

4. The method of claim 1, comprising:
receiving, by the non-anchor node, the user data from the wireless communication device after initiating a radio resource control (RRC) connection resume procedure;
receiving, by the non-anchor node from the anchor node, a RRC resume container in a second message, without the context information of the wireless communication device; and
sending, by the non-anchor node to the wireless communication device, content of the RRC resume container.

5. The method of claim 4, wherein the anchor node comprises a first next generation Node B (gNB) or next-generation evolved node B (ng-eNB), the non-anchor node comprises a second gNB or ng-eNB, the first message comprises an Xn application protocol (XnAP) RETRIEVE UE CONTEXT REQUEST message or a first XnAP RRC TRANSFER message, and the second message comprises an XnAP RETRIEVE UE CONTEXT FAILURE message or a second XnAP RRC TRANSFER message.

6. The method of claim 1, comprising:
receiving, by the non-anchor node, the user data without RRC signaling from the wireless communication device while in a radio resource control (RRC) inactive state;
receiving, by the non-anchor node from the anchor node, a user data container in a second message, without the context information of the wireless communication device; and
sending, by the non-anchor node, to the wireless communication device, content of the user data container.

7. The method of claim 6, wherein the anchor node comprises a first next generation Node B (gNB) or next-generation evolved node B (ng-eNB), the non-anchor node comprises a second gNB or ng-eNB, the first message comprises a first Xn application protocol (XnAP) USER DATA TRANSFER message or a first XnAP RRC TRANSFER message, and the second message comprises a second XnAP USER DATA TRANSFER message or a second XnAP RRC TRANSFER message.

8. The method of claim 1, comprising:
receiving, by the non-anchor node, the user data from the wireless communication device after initiating a radio resource control (RRC) connection resume procedure;
receiving, by the non-anchor node from the anchor node, a user data container in a second message, without the context information of the wireless communication device; and
sending, by the non-anchor node to the wireless communication device, content of the user data container.

9. The method of claim 8, wherein the anchor node comprises a centralized unit (CU) of first next generation Node B (gNB) or next-generation evolved node B (ng-eNB), the non-anchor node comprises a distributed unit (DU) of a second gNB or ng-eNB, the first message comprises a F1 application protocol (F1AP) UPLINK RRC MESSAGE TRANSFER message, F1AP UE CONTEXT MODIFICATION REQUIRED message, F1AP INITIAL UL RRC MESSAGE TRANSFER message, and the second message comprises an F1AP DOWNLINK RRC MESSAGE TRANSFER message, F1AP UE CONTEXT MODIFICATION CONFIRM message.

10. The method of claim 1, comprising:
receiving, by the non-anchor node, the user data without RRC signaling from the wireless communication device while in a radio resource control (RRC) inactive state;
receiving, by the non-anchor node from the anchor node, a user data container in a second message, without the context information of the wireless communication device; and
sending, by the non-anchor node to the wireless communication device, content of the user data container.

11. The method of claim 10, wherein the anchor node comprises a centralized unit (CU) of first next generation Node B (gNB) or next-generation evolved node B (ng-eNB), the non-anchor node comprises a distributed unit (DU) of a second gNB or ng-eNB, the first message comprises a first F1 application protocol (F1AP) USER DATA TRANSFER message, F1AP UE CONTEXT MODIFICATION REQUIRED message, F1AP INITIAL UL RRC MESSAGE TRANSFER message, and the second message comprises a second F1AP USER DATA TRANSFER message, F1AP UE CONTEXT MODIFICATION REQUEST message, F1AP UE CONTEXT MODIFICATION CONFIRM message.

12. The method of claim 1, comprising:
receiving, by the non-anchor node, the user data without RRC signaling from the wireless communication device while in a radio resource control (RRC) inactive state;
receiving, by the non-anchor node from the anchor node, a user data container in a second message, without the context information of the wireless communication device; and
sending, by the non-anchor node to the wireless communication device, content of the user data container.

13. The method of claim 12, wherein the anchor node comprises a centralized unit user plane (CU-UP) of first next generation Node B (gNB) or next-generation evolved node B (ng-eNB), the non-anchor node comprises a centralized unit control plane (CU-CP) of a second gNB or ng-eNB, the first message comprises a first E1 application protocol (E1AP) USER DATA TRANSFER message, a E1AP BEARER CONTEXT MODIFICATION REQUEST message and the second message comprises a second E1AP USER DATA TRANSFER message, a E1AP BEARER CONTEXT MODIFICATION REQUIRED message.

14. The method of claim 1, comprising:
receiving, by the non-anchor node, the user data from the wireless communication device after initiating a radio resource control (RRC) connection resume procedure;
receiving, by the non-anchor node from the anchor node, a user data container in a second message, without the context information of the wireless communication device; and
sending, by the non-anchor node to the wireless communication device, content of the user data container.

15. The method of claim 14, wherein the anchor node comprises a centralized unit user plane (CU-UP) of first next generation Node B (gNB) or next-generation evolved node B (ng-eNB), the non-anchor node comprises a centralized unit control plane (CU-CP) of a second gNB or ng-eNB, the first message comprises a E1 application protocol (E1AP) BEARER CONTEXT MODIFICATION REQUEST message, a first E1AP USER DATA TRANSFER message or a E1AP BEARER CONTEXT MODIFICATION CONFIRM message, and the second message comprises an E1AP BEARER CONTEXT MODIFICATION RESPONSE message, a second E1AP USER DATA TRANSFER message or a E1AP BEARER CONTEXT MODIFICATION REQUIRED message.

16. The method of claim 1, wherein the user data container comprises at least one of:
- an information element (IE);
- an identification of the wireless communication device;
- an identification of context information of the wireless communication device;
- an identification of a data radio bearer (DRB) associated with the uplink air interface protocol PDU;
- an identification of a PDU session associated with the uplink air interface protocol PDU;
- an identification of an associated quality of service (QOS) flow;
- a sequence number (SN) associated with the uplink air interface protocol PDU;
- a hyper frame number (HFN) associated with the uplink air interface protocol PDU; or
- a count value associated with the uplink air interface protocol PDU.

17. A method, comprising:
receiving, by an anchor node having full context information of a wireless communication device, an uplink air interface protocol protocol data unit (PDU) in a user data container of a first message, from a non-anchor node, the uplink air interface PDU having user data of the wireless communication device to send uplink decoded by the non-anchor node using a partial portion of context information of the wireless communication device; and
sending, by the anchor node to the non-anchor node, the uplink received air interface protocol PDU in a user data container of a second message, with the full context information of the wireless communication device, the non-anchor node receiving the user data from the wireless communication device after initiating a radio resource control (RRC) connection resume procedure.

18. The method of claim 17, comprising:
causing, by the anchor node, the non-anchor node to decode, using the full context information of the wireless communication device, the uplink air interface protocol PDU to at least one of: an air interface protocol service data unit (SDU) or a quality of service (QOS) flow packet.

19. A non-anchor node, comprising:
at least one processor to:
receive, via a transceiver, user data of a wireless communication device to send uplink;
decode the user data into an uplink air interface protocol protocol data unit (PDU), using a partial portion of context information of the wireless communication device;
send, via the transceiver, the uplink air interface protocol PDU in a user data container of a first message, to an anchor node having full context information of the wireless communication device; and
receive, via the transceiver, the uplink received air interface protocol PDU in a user data container of a second message, with the full context information of the wireless communication device in response to the anchor node determining that the full context information identified in accordance with the user data container is to be sent.

20. An anchor node having full context information of a wireless communication device, comprising:
at least one processor to:
receive, via a receiver, an uplink air interface protocol protocol data unit (PDU) in a user data container of a first message, from a non-anchor node, the uplink air interface PDU having user data of the wireless communication device to send uplink decoded by the non-anchor node using a partial portion of context information of the wireless communication device; and
sending, via the receiver, the uplink received air interface protocol PDU in a user data container of a second message, with the full context information of the wireless communication device, the non-anchor node receiving the user data from the wireless communication device after initiating a radio resource control (RRC) connection resume procedure.

* * * * *